United States Patent
Hoetzl et al.

(10) Patent No.: US 8,454,744 B2
(45) Date of Patent: Jun. 4, 2013

(54) USE OF POLYOLS AND CYCLOHEXANE POLYCARBOXYLIC ACID DERIVATIVES FOR THE REMOVAL OF DUST FROM CHEMICAL CONSTRUCTION PRODUCTS

(75) Inventors: Klaus-Dieter Hoetzl, Augsburg (DE); Silvia Dürndorfer, Gersthofen (DE); Joachim Riedmiller, Friedberg (DE); Volker Schwarz, Augsburg (DE); Werner Stohr, Augsburg (DE)

(73) Assignee: Construction Research & Technology GmbH, Trostberg (DE)

( * ) Notice: Subject to any disclaimer, the term of this patent is extended or adjusted under 35 U.S.C. 154(b) by 21 days.

(21) Appl. No.: 13/129,227

(22) PCT Filed: Sep. 7, 2009

(86) PCT No.: PCT/EP2009/061550
§ 371 (c)(1),
(2), (4) Date: Jul. 18, 2011

(87) PCT Pub. No.: WO2010/060659
PCT Pub. Date: Jun. 3, 2010

(65) Prior Publication Data
US 2011/0265693 A1    Nov. 3, 2011

(30) Foreign Application Priority Data

Nov. 25, 2008 (EP) .................................... 08169851

(51) Int. Cl.
*C04B 24/04* (2006.01)

(52) U.S. Cl.
USPC ............ 106/696; 106/724; 106/728; 106/778

(58) Field of Classification Search
USPC .................................. 106/696, 724, 728, 778
See application file for complete search history.

(56) References Cited

U.S. PATENT DOCUMENTS

| | | | | |
|---|---|---|---|---|
| 2,275,385 A | * | 3/1942 | Soday | 560/127 |
| 4,055,439 A | * | 10/1977 | Babler et al. | 106/410 |
| 4,756,759 A | * | 7/1988 | Amon et al. | 106/31.65 |
| 4,780,143 A | | 10/1988 | Roe | |
| 5,360,841 A | | 11/1994 | Knop et al. | |
| 6,468,632 B2 | * | 10/2002 | Winkowski | 428/192 |
| 7,618,490 B2 | * | 11/2009 | Nakashima et al. | 106/724 |
| 7,816,553 B2 | | 10/2010 | Storzum et al. | |
| 8,262,793 B2 | * | 9/2012 | Stohr et al. | 106/810 |
| 2008/0039646 A1 | | 2/2008 | Storzum et al. | |
| 2009/0029173 A1 | * | 1/2009 | Schramm et al. | 428/413 |

FOREIGN PATENT DOCUMENTS

| | | |
|---|---|---|
| DE | 35 38791 A1 | 5/1987 |
| DE | 20 2006 016797 U1 | 12/2006 |
| EP | 0 403 974 A1 | 12/1990 |
| JP | 63-297255 A | 12/1988 |
| WO | WO 2005/123821 A2 | 12/2005 |
| WO | WO 2006/084588 A2 | 8/2006 |

OTHER PUBLICATIONS

PCT/EP2009/061550—International Search Report, Feb. 11, 2010.
PCT/EP2009/061550—Written Opinion of the International Searching Authority, Feb. 11, 2010.
PCT/EP2009/061550—International Preliminary Report on Patentability, May 31, 2011.
Katsuki, N., et al., "Dust-Reducing Agent for Concrete Spraying", Chemical Abstracts, Sep. 4, 1989, vol. III, No. 10, p. 328, XP60212.

\* cited by examiner

*Primary Examiner* — Paul Marcantoni
(74) *Attorney, Agent, or Firm* — Curatolo Sidoti Co., LPA; Joseph G. Curatolo; Salvatore A. Sidoti

(57) ABSTRACT

The use of a mixture of at least one polyol and at least one cyclohexanepolycarboxylic acid derivative for reducing or minimizing the dust emission when handling pulverulent construction chemistry products, processes for the preparation of the pulverulent construction chemistry products and hydraulically setting materials containing the mixture according to the invention are proposed.

21 Claims, No Drawings

USE OF POLYOLS AND CYCLOHEXANE POLYCARBOXYLIC ACID DERIVATIVES FOR THE REMOVAL OF DUST FROM CHEMICAL CONSTRUCTION PRODUCTS

CROSS REFERENCE TO RELATED APPLICATIONS

This application is a national stage application of International Application No. PCT/EP2009/061550, filed 7 Sep. 2009, which claims priority from European Patent Application Serial No. 08169851.6, filed 25 Nov. 2008, from which applications priority is claimed, and which are incorporated herein by reference.

The present invention relates to the use of a mixture of polyols and cyclohexanepolycarboxylic acid derivatives for reducing or minimizing the dust emission during handling of pulverulent construction chemistry products, a process for the preparation of the pulverulent construction chemistry products, and hydraulically setting materials containing the mixture according to the invention comprising polyols and cyclohexanepolycarboxylic acid derivatives.

Dry, in particular pulverulent construction chemistry products, such as hydraulically setting or cement-containing materials (e.g. tile adhesive, joint filler, filling compounds, slurry coating, etc.), lead to substantial dust formation during decanting and mixing processes owing to their fine and very fine particle fractions. Numerous attempts have therefore been made to reduce or to suppress the dust emission in such products.

Attempts have been made, for example, to reduce the dust emission in the case of hydraulically setting materials, for example filling compounds, via the degree of grinding or the particle composition of the pulverulent products, but the processability of coarser powders is poorer.

A further method for reducing the dust emission is aggregation, for example with water, aqueous solutions or dispersions. Thus, for example, U.S. Pat. No. 4,780,143 discloses the addition of aqueous foam to clinker before grinding to cement in order to reduce the dust emission. Additions of plastics dispersions to cement for air-placed concrete compositions have also been proposed for reducing the dust formation. Temporary aggregation in the case of hydraulically setting materials is unimportant only when the products are subsequently ground or, for example, are to be used as air-placed concrete or pneumatically applied mortar. In finely pulverulent filling compounds, for example, on which floor coverings are to be laid after application, relatively coarse aggregations are however not acceptable since they are perceptible on the surface of many smooth floor covering materials.

In EP 403 874 A1, special ethylene oxide/propylene oxide block copolymers are mentioned as additives for dust reduction. However, a disadvantage of these additives is that large amounts thereof often have to be used for achieving a significant effect.

WO 2006/084588 A1 discloses the use of highly viscous, linear hydrocarbons or hydrocarbon mixtures as additives for reducing the dust emission of pulverulent construction chemistry products. A disadvantage of the systems described there is the high viscosity of the hydrocarbons used, which also result in high consumption and hence low efficiency of the additives employed.

The Utility Model DE 20 2006 016 797 U1 relates to a low-dust dry mortar which contains at least one dust-reducing component in an amount of 0.01 to 10% by weight, based on the total dry mixture. The dust-reducing component is selected from the series consisting of the monoalcohols, such as, for example, 3-methoxybutanol, benzyl alcohol, 1,2-propanediol, hexanol, diacetone alcohol, ethyldiglycol, isopropanol or 2-ethylhexanol, and/or alkanediols, such as 2-methylpentane-2,4-diol, neopentylglycol and n-butane-2,5-diol. Glycols, polyethylene glycols, fatty alcohols and polyvinyl alcohols are furthermore suitable. Aliphatic ethers, cellulose ethers, alkoxylates and methyl/ethyl fatty acid ethers are mentioned in particular.

The known dust-reducing additives have to be used in certain minimum concentrations in order to achieve the desired effect in construction chemistry products. The desired dust-reducing effect is defined via the dust index. A further important aspect is that the dedusting effect is retained as far as possible at the same order of magnitude over the storage time of the mortar. The dust-reducing additives always influence the desired properties of the construction chemistry products in a certain manner. In some cases, the composition of the construction chemistry products must be appropriately adapted, which may be associated with considerable formulation costs. Particularly when the dedusting additives are used in relatively high concentration, such a measure is necessary. Attempts are therefore made to keep the concentration in which the dedusting additives are used as low as possible. From economic points of view, too, it is desirable to use as low a concentration as possible. The necessary concentrations of the additives for dedusting also depend in particular on the composition of the products. For cement-based tile adhesives, filling compounds, joint mortars, slurry coatings and repair mortars, the use of polyols, in particular polyethylene oxide, has proved particularly useful. The desired property profile of the product dedusted therewith is influenced therewith only to an insignificant extent.

Since the fundamental problem with the dust emission of construction chemistry mixtures has still not been finally eliminated, especially from economic points of view, with said compounds and processes, it was the object of the present invention to provide additives for reducing the dust emission which are suitable in an advantageous manner as dedusting agents for pulverulent construction chemistry products and which are distinguished by easy application and high efficiency. In addition, during the use, they should show no tendency to agglomeration and should not adversely affect the quality of the hardened systems.

The object was achieved according to the invention by the use of a mixture containing at least one polyol and at least one cyclohexanepolycarboxylic acid derivative of the formula (I)

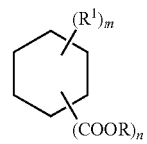

(I)

in which
$R^1$ represents $C_1$-$C_{10}$-alkyl or $C_3$-$C_8$-cycloalkyl,
m represents 0, 1, 2 or 3,
n represents 2, 3 or 4, and
R represents hydrogen or $C_1$-$C_{30}$-alkyl, $C_1$-$C_{30}$-alkoxy or $C_3$-$C_8$-cycloalkyl, at least one radical R representing $C_1$-$C_{30}$-alkyl, $C_1$-$C_{30}$-alkoxy or $C_3$-$C_8$-cycloalkyl,
as an additive for dedusting pulverulent construction chemistry products.

The present invention therefore relates to the use of a mixture containing at least one polyol and at least one cyclohexanepolycarboxylic acid derivative as an additive for reducing or minimizing the dust emission when handling pulverulent construction chemistry products comprising organic and/or mineral constituents, a process for the preparation of the pulverulent construction chemistry products, and pulverulent construction chemistry products containing the mixture according to the invention comprising at least one polyol and at least one cyclohexanepolycarboxylic acid derivative.

In the formula (I), the radicals $R^1$ may be identical or different if m=2 or 3. The $C_1$-$C_{10}$-alkyl groups may be straight-chain or branched. If $R^1$ represents an alkyl group, it is preferably a $C_1$-$C_8$-alkyl group, particularly preferably a $C_1$-$C_6$-alkyl group. Examples of such alkyl groups are methyl, ethyl, n-propyl, isopropyl, n-butyl, isobutyl, sec-butyl, tert-butyl, n-pentyl, n-hexyl, n-octyl and 2-ethylhexyl. m is preferably 0.

The m radicals R may be identical or different. The $C_1$-$C_{30}$-alkyl groups and the alkyl radicals of the $C_1$-$C_{30}$-alkoxy groups may be straight-chain or branched. R is preferably $C_1$-$C_{30}$-alkyl, $C_1$-$C_{20}$-alkyl, particularly preferably $C_1$-$C_{18}$-alkyl, very particularly preferably $C_1$-$C_{13}$-alkyl. Examples of such alkyl groups are the alkyl groups already mentioned for $R^1$, and n-nonyl, isononyl, n-decyl, isodecyl, n-undecyl, isoundecyl, n-dodecyl, isododecyl, n-tridecyl, isotridecyl, stearyl, and n-eicosyl.

The alkyl groups may be in each case individual isomers of said alkyl groups or mixtures of different alkyl groups. The different alkyl groups may be different isomers having the same number of carbon atoms and/or alkyl groups which have a different number of carbon atoms.

The polyols are preferably polyetherpolyols, polyesterpolyols, polybutadienepolyols and polycarbonatepolyols, mixtures of these compounds also being possible. The polyols preferably contain between two and 10, particularly preferably between two and three hydroxyl groups, and have a weight average molecular weight between 32 and 20 000, particularly preferably between 40 and 2000 and in particular between 50 and 600 g/mol. Suitable polyols are preferably the polyhydroxy compounds which are liquid at room temperature. Difunctional polyethylene glycols may be mentioned as typical examples. It is also possible to use random copolymers and/or block copolymers of ethylene oxide and propylene oxide, which copolymers have hydroxyl groups. Suitable polyetherpolyols are the known polyethers, such as the polyols composed of styrene oxide, propylene oxide, butylene oxide, tetrahydrofuran or epichlorohydrin and prepared with the use of initiator molecules. The polyol is preferably polyethylene glycol, polypropylene glycol, polytetramethylene glycol and polystyrene oxide, particularly preferably polyethylene glycol having an average molar mass of 200 to 600 g/mol.

A further copolymer type which can be used as a polyol component and has terminal hydroxyl groups is in accordance with the general formula (preparable, for example, by means of "controlled" high-speed anionic polymerization according to Macromolecules 2004, 37, 4038-4043):

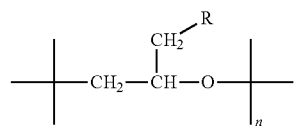

in which R is identical or different and is preferably represented by OMe, OiPr, Cl or Br.

In particular, the polyester di- or polyols which are liquid at 25° C. and can be prepared by condensation of di- or tricarboxylic acids, such as adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid and/or dimeric fatty acid, with low molecular weight diols, triols or polyols, such as ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimeric fatty alcohol, glycerol, pentaerythritol and/or trimethylolpropane, are furthermore suitable as a polyol component.

A further suitable group of the polyols comprises the polyesters, for example based on caprolactone, which are also referred to as "polycaprolactones". Further polyols which can be used are polycarbonatepolyols and dimeric diols and polyols based on vegetable oils and their derivatives, such as castor oil and derivatives thereof or epoxidized soya bean oil. Polycarbonates which have hydroxyl groups and are obtainable by reaction of carbonic acid derivatives, e.g. diphenyl carbonate, dimethyl carbonate or phosgene, with diols are also suitable. For example, ethylene glycol, 1,2- and 1,3-propanediol, 1,3- and 1,4-butanediol, 1,6-hexanediol, 1,8-octanediol, neopentylglycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A, glycerol, trimethylolpropane, 1,2,6-hexanetriol, 1,2,4-butanetriol, trimethylolpropane, pentaerythritol, quinitol, mannitol, sorbitol, methylglycoside and 1,3,4,6-dianhydrohexite are particularly suitable. Hydroxyfunctional polybutadienes, which are commercially available, inter alia, under the trade name "Poly-bd®", can also be used as polyols, as can the hydrogenated analogues thereof. Hydroxy-functional polysulphides, which are sold under the trade name "Thiokol® NPS-282" and hydroxy-functional polysiloxanes are furthermore suitable.

The pulverulent construction chemistry products contain organic and/or mineral constituents.

Pulverulent construction chemistry products comprising organic and/or mineral constituents may be, for example, tile adhesive, slurry coating, reinforcing adhesive, adhesives for composite thermal insulation systems, mineral renders, repair mortar, self-levelling filling compounds, fine filler, screed systems, thick-bed mortar, joint mortar or surface protection systems, but also pigment formulations.

The organic constituents of the construction chemistry products are understood as meaning, for example, redispersible polymer powders, thickeners, stabilizers, antifoams, dispersants, emulsifiers or pigments.

The mineral constituents may be, for example, cement, gypsum, anhydrite, lime, chalk, sand, quartz powder, clay, ash, slag, microsilica, light fillers, such as expanded glass, expanded clay, Poraven®, Expancell®, and pigments.

The invention furthermore relates to the use of the mixture according to the invention, containing at least one polyol and at least one cyclohexanepolycarboxylic acid derivative, as additives for dedusting pulverulent polymers or polymer powders and redispersible polymer powders as shown below:

| Redispersible polymer powders | Polymers | Polymer powders |
|---|---|---|
| VAc/E/Veova | starches | PVC (polyvinyl chloride) |
| S/acrylate | celluloses | phenol resin binders |
| S/B | gums | vinurans |
| UF/MF | | Kaurit resins |
| Pure acrylates | | |

VAc = vinyl acetate
S = styrene
B = butadiene
E = ethylene
Veova = vinyl ester of versatic acid
UF = urea-formaldehyde
MF = melamine-formaldehyde The cyclohexanepolycarboxylic acid derivatives used according to the invention are in particular mono-, di-, tri- and tetraesters and anhydrides of the cyclohexanepolycarboxylic acids. Preferably, all carboxyl groups are present in the esterified form. The esters used are alkyl, cycloalkyl and alkoxyalkyl esters, preferably alkyl esters, preferred alkyl groups R having already been mentioned above.

The at least one cyclohexanepolycarboxylic acid derivative is preferably selected from the group consisting of mono- and dialkyl esters of phthalic acid, isophthalic acid and terephthalic acid, which esters are hydrogenated on the nucleus, mono-, di- and trialkyl esters of trimellitic acid, of trimesic acid and of hemimellitic acid, which esters are hydrogenated on the nucleus, or mono-, di-, tri- and tetraalkyl esters of pyromellitic acid, where the alkyl groups R may be linear or branched and have in each case 1 to 30, preferably 1 to 20, particularly preferably 1 to 18, very particularly preferably 1 to 13, carbon atoms, and mixtures of two or more thereof. Suitable alkyl groups R have already been mentioned above.

Particularly preferred are alkyl cyclohexane-1,4-dicarboxylates, such as, for example, monomethyl cyclohexane-1,4-dicarboxylate, dimethyl cyclohexane-1,4-dicarboxylate, diethyl cyclohexane-1,4-dicarboxylate, di-n-propyl cyclohexane-1,4-dicarboxylate, di-n-butyl cyclohexane-1,4-dicarboxylate, di-tert-butyl cyclohexane-1,4-dicarboxylate, diisobutyl cyclohexane-1,4-dicarboxylate, monoglycol cyclohexane-1,4-dicarboxylate, diglycol cyclohexane-1,4-dicarboxylate, di-n-octyl cyclohexane-1,4-dicarboxylate, diisooctyl cyclohexane-1,4-dicarboxylate, mono-2-ethylhexyl cyclohexane-1,4-dicarboxylate, di-2-ethylhexyl cyclohexane-1,4-dicarboxylate, di-n-nonyl cyclohexane-1,4-dicarboxylate, diisononyl cyclohexane-1,4-dicarboxylate, di-n-decyl cyclohexane-1,4-dicarboxylate, di-n-undecyl cyclohexane-1,4-dicarboxylate, diisodecyl cyclohexane-1,4-dicarboxylate, diisododecyl cyclohexane-1,4-dicarboxylate, di-n-octadecyl cyclohexane-1,4-dicarboxylate, diisooctadecyl cyclohexane-1,4-dicarboxylate, di-n-eicosyl cyclohexane-1,4-dicarboxylate, monocyclohexyl cyclohexane-1,4-dicarboxylate, dicyclohexyl cyclohexane-1,4-dicarboxylate;

diisopropyl cyclohexane-1,4-dicarboxylate, di-n-hexyl cyclohexane-1,4-dicarboxylate, diisohexyl cyclohexane-1,4-dicarboxylate, di-n-heptyl cyclohexane-1,4-dicarboxylate, diisoheptyl cyclohexane-1,4-dicarboxylate, di-2-propylheptyl cyclohexane-1,4-dicarboxylate, diisoundecyl cyclohexane-1,4-dicarboxylate, di-n-dodecyl cyclohexane-1,4-dicarboxylate, di-n-tridecyl cyclohexane-1,4-dicarboxylate, diisotridecyl cyclohexane-1,4-dicarboxylate, di-n-pentyl cyclohexane-1,4-dicarboxylate, diisopentyl cyclohexane-1,4-dicarboxylate;

diisopropyl cyclohexane-1,2-dicarboxylate, di-n-hexyl cyclohexane-1,2-dicarboxylate, diisohexyl cyclohexane-1,2-dicarboxylate, di-n-heptyl cyclohexane-1,2-dicarboxylate, diisoheptyl cyclohexane-1,2-dicarboxylate, di-2-propylheptyl cyclohexane-1,2-dicarboxylate, diisoundecyl cyclohexane-1,2-dicarboxylate, di-n-dodecyl cyclohexane-1,2-dicarboxylate, di-n-tridecyl cyclohexane-1,2-dicarboxylate, diisotridecyl cyclohexane-1,2-dicarboxylate, di-n-pentyl cyclohexane-1,2-dicarboxylate, diisopentyl cyclohexane-1,2-dicarboxylate;

alkyl cyclohexane-1,2-dicarboxylates, such as, for example, monomethyl cyclohexane-1,2-dicarboxylate, dimethyl cyclohexane-1,2-dicarboxylate, diethyl cyclohexane-1,2-dicarboxylate, di-n-propyl cyclohexane-1,2-dicarboxylate, di-n-butyl cyclohexane-1,2-dicarboxylate, di-tert-butyl cyclohexane-1,2-dicarboxylate, diisobutyl cyclohexane-1,2-dicarboxylate, monoglycol cyclohexane-1,2-dicarboxylate, diglycol cyclohexane-1,2-dicarboxylate, di-n-octyl cyclohexane-1,2-dicarboxylate, diisooctyl cyclohexane-1,2-dicarboxylate, di-2-ethylhexyl cyclohexane-1,2-dicarboxylate, di-n-nonyl cyclohexane-1,2-dicarboxylate, diisononyl cyclohexane-1,2-dicarboxylate, di-n-decyl cyclohexane-1,2-dicarboxylate, diisodecyl cyclohexane-1,2-dicarboxylate, di-n-undecyl cyclohexane-1,2-dicarboxylate, diisododecyl cyclohexane-1,2-dicarboxylate, di-n-octadecyl cyclohexane-1,2-dicarboxylate, diisooctadecyl cyclohexane-1,2-dicarboxylate, di-n-eicosyl cyclohexane-1,2-dicarboxylate, monocyclohexyl cyclohexane-1,2-dicarboxylate, dicyclohexyl cyclohexane-1,2-dicarboxylate;

mixed esters of cyclohexane-1,2-dicarboxylic acid with $C_1$- to $C_{13}$-alcohols, such as, for example, ethyl methyl cyclohexane-1,2-dicarboxylate, n-propyl methyl cyclohexane-1,2-dicarboxylate, isopropyl methyl cyclohexane-1,2-dicarboxylate, n-butyl methyl cyclohexane-1,2-dicarboxylate, tert-butyl methyl cyclohexane-1,2-dicarboxylate, isobutyl methyl cyclohexane-1,2-dicarboxylate, glycol methyl cyclohexane-1,2-dicarboxylate, n-hexyl methyl cyclohexane-1,2-dicarboxylate, isohexyl methyl cyclohexane-1,2-dicarboxylate, n-heptyl methyl cyclohexane-1,2-dicarboxylate, isoheptyl methyl cyclohexane-1,2-dicarboxylate, n-octyl methyl cyclohexane-1,2-dicarboxylate, isooctyl methyl cyclohexane-1,2-dicarboxylate, 2-ethylhexyl methyl cyclohexane-1,2-dicarboxylate, n-nonyl methyl cyclohexane-1,2-dicarboxylate, isononyl methyl cyclohexane-1,2-dicarboxylate, 2-propylheptyl methyl cyclohexane-1,2-dicarboxylate, n-decyl methyl cyclohexane-1,2-dicarboxylate, isodecyl methyl cyclohexane-1,2-dicarboxylate, n-undecyl methyl cyclohexane-1,2-dicarboxylate, isoundecyl methyl cyclohexane-1,2-dicarboxylate, n-dodecyl methyl cyclohexane-1,2-dicarboxylate, isododecyl methyl cyclohexane-1,2-dicarboxylate, n-tridecyl methyl cyclohexane-1,2-dicarboxylate, isotridecyl methyl cyclohexane-1,2-dicarboxylate, n-propyl ethyl cyclohexane-1,2-dicarboxylate, isopropyl ethyl cyclohexane-1,2-dicarboxylate, n-butyl ethyl cyclohexane-1,2-dicarboxylate, tert-butyl ethyl cyclohexane-1,2-dicarboxylate, isobutyl ethyl cyclohexane-1,2-dicarboxylate, glycol ethyl cyclohexane-1,2-dicarboxylate, n-hexyl ethyl cyclohexane-1,2-dicarboxylate, isohexyl ethyl cyclohexane-1,2-dicarboxylate, n-heptyl ethyl cyclohexane-1,2-dicarboxylate, isoheptyl ethyl cyclohexane-1,2-dicarboxylate, n-octyl ethyl cyclohexane-1,2-dicarboxylate, isooctyl ethyl cyclohexane-1,2-dicarboxylate, 2-ethylhexyl ethyl cyclohexane-1,2-dicarboxylate, n-nonyl ethyl cyclohexane-1,2-dicarboxylate, isononyl ethyl cyclohexane-1,2-dicarboxylate, 2-propylheptyl ethyl cyclohexane-1,2-dicarboxylate, n-decyl ethyl cyclohexane-1,2-dicarboxylate, isodecyl ethyl cyclohexane-1,2-dicarboxylate, n-undecyl ethyl cyclohexane-1,2-dicarboxylate, isoundecyl ethyl cyclohexane-1,2-dicarboxylate, n-dodecyl ethyl cyclohexane-1,2-dicarboxylate, isododecyl ethyl cyclohexane-1,2-dicarboxylate, n-tridecyl ethyl cyclohexane-1,2-dicarboxylate, isotridecyl ethyl cyclohexane-1,2-dicarboxylate, isopropyl n-propyl cyclohexane-1,2-dicarboxylate, n-butyl n-propyl cyclohexane-1,2-dicarboxylate, tert-butyl n-propyl cyclohexane-1,2-dicarboxylate, isobutyl n-propyl cyclohexane-1,2-dicarboxylate, glycol n-propyl cyclohexane-1,2-dicarboxylate, n-hexyl n-propyl cyclohexane-1,2-dicarboxylate, isohexyl n-propyl cyclohexane-1,2-dicarboxylate, n-heptyl n-propyl cyclohexane-1,2-dicarboxylate, isoheptyl n-propyl cyclohexane-1,2-dicarboxylate, n-octyl n-propyl cyclohexane-1,2-dicarboxylate, isooctyl n-propyl cyclohexane-1,2-dicarboxylate, 2-ethylhexyl n-propyl cyclohexane-1,2-dicarboxylate, n-nonyl n-propyl cyclohexane-1,2-dicarboxylate, isononyl n-propyl cyclohexane-1,2-dicarboxylate, 2-propylheptyl n-propyl cyclohexane-1,2-dicarboxylate, n-decyl n-propyl cyclohexane-1,2-dicarboxylate, isodecyl n-propyl cyclohexane-1,2-dicarboxylate, n-undecyl n-propyl cyclohexane-1,2-dicarboxylate, isoundecyl n-propyl cyclohexane-1,2-dicarboxylate, n-dodecyl n-propyl cyclohexane-1,2-dicarboxylate, isododecyl n-propyl cyclohexane-1,2-dicarboxylate, n-tridecyl n-propyl cyclohexane-1,2-dicarboxylate, isotridecyl n-propyl cyclohexane-1,2-dicarboxylate, n-butyl isopropyl cyclohexane-1,2-dicarboxylate, tert-butyl isopropyl cyclohexane-1,2-dicarboxylate, isobutyl isopropyl cyclohexane-1,2-dicarboxylate, glycol isopropyl cyclohexane-1,2-dicarboxylate, n-hexyl isopropyl cyclohexane-1,2-dicarboxylate, isohexyl isopropyl cyclohexane-1,2-dicarboxylate, n-heptyl isopropyl cyclohexane-1,2-dicarboxylate, isoheptyl isopropyl cyclohexane-1,2-dicarboxylate, n-octyl isopropyl cyclohexane-1,2-dicarboxylate, isooctyl isopropyl cyclohexane-1,2-dicarboxylate, 2-ethylhexyl isopropyl cyclohexane-1,2-dicarboxylate, n-nonyl isopropyl cyclohexane-1,2-dicarboxylate, isononyl isopropyl cyclohexane-1,2-dicarboxylate, 2-propylheptyl isopropyl cyclohexane-1,2-dicarboxylate, n-decyl isopropyl cyclohexane-1,2-dicarboxylate, isodecyl isopropyl cyclohexane-1,2-dicarboxylate, n-undecyl isopropyl cyclohexane-1,2-dicarboxylate, isoundecyl isopropyl cyclohexane-1,2-dicarboxylate, n-dodecyl isopropyl cyclohexane-1,2-dicarboxylate, isododecyl isopropyl cyclohexane-1,2-dicarboxylate, n-tridecyl isopropyl cyclohexane-1,2-dicarboxylate, isotridecyl isopropyl cyclohexane-1,2-dicarboxylate, tert-butyl n-butyl cyclohexane-1,2-dicarboxylate, isobutyl n-butyl cyclohexane-1,2-dicarboxylate, glycol n-butyl cyclohexane-1,2-dicarboxylate, n-hexyl n-butyl cyclohexane-1,2-dicarboxylate, isohexyl n-butyl cyclohexane-1,2-dicarboxylate, n-heptyl n-butyl cyclohexane-1,2-dicarboxylate, isoheptyl n-butyl cyclohexane-1,2-dicarboxylate, n-octyl n-butyl cyclohexane-1,2-dicarboxylate, isooctyl n-butyl cyclohexane-1,2-dicarboxylate, 2-ethylhexyl n-butyl cyclohexane-1,2-dicarboxylate, n-nonyl n-butyl cyclohexane-1,2-dicarboxylate, isononyl n-butyl cyclohexane-1,2-dicarboxylate, 2-propylheptyl n-butyl cyclohexane-1,2-dicarboxylate, n-decyl n-butyl cyclohexane-1,2-dicarboxylate, isodecyl n-butyl cyclohexane-1,2-dicarboxylate, n-undecyl n-butyl cyclohexane-1,2-dicarboxylate, isoundecyl n-butyl cyclohexane-1,2-dicarboxylate, n-dodecyl n-butyl cyclohexane-1,2-dicarboxylate, isododecyl n-butyl cyclohexane-1,2-dicarboxylate, n-tridecyl n-butyl cyclohexane-1,2-dicarboxylate, isotridecyl n-butyl cyclohexane-1,2-dicarboxylate, isobutyl tert-butyl cyclohexane-1,2-dicarboxylate, glycol tert-butyl cyclohexane-1,2-dicarboxylate, n-hexyl tert-butyl cyclohexane-1,2-dicarboxylate, isohexyl tert-butyl cyclohexane-1,2-dicarboxylate, n-heptyl tert-butyl cyclohexane-1,2-dicarboxylate, isoheptyl tert-butyl cyclohexane-1,2-dicarboxylate, n-octyl tert-butyl cyclohexane-1,2-dicarboxylate, isooctyl tert-butyl cyclohexane-1,2-dicarboxylate, 2-ethylhexyl tert-butyl cyclohexane-1,2-dicarboxylate, n-nonyl tert-butyl cyclohexane-1,2-dicarboxylate, isononyl tert-butyl cyclohexane-1,2-dicarboxylate, 2-propylheptyl tert-butyl cyclohexane-1,2-dicarboxylate, n-decyl tert-butyl cyclohexane-1,2-dicarboxylate, isodecyl tert-butyl cyclohexane-1,2-dicarboxylate, n-undecyl tert-butyl cyclohexane-1,2-dicarboxylate, isoundecyl tert-butyl cyclohexane-1,2-dicarboxylate, n-dodecyl tert-butyl cyclohexane-1,2-dicarboxylate, isododecyl tert-butyl cyclohexane-1,2-dicarboxylate, n-tridecyl tert-butyl cyclohexane-1,2-dicarboxylate, isotridecyl tert-butyl cyclohexane-1,2-dicarboxylate, glycol isobutyl cyclohexane-1,2-dicarboxylate, n-hexyl isobutyl cyclohexane-1,2-dicarboxylate, isohexyl isobutyl cyclohexane-1,2-dicarboxylate, n-heptyl isobutyl cyclohexane-1,2-dicarboxylate, isoheptyl isobutyl cyclohexane-1,2-dicarboxylate, n-octyl isobutyl cyclohexane-1,2-dicarboxylate, isooctyl isobutyl cyclohexane-1,2-dicarboxylate, 2-ethylhexyl isobutyl cyclohexane-1,2-dicarboxylate, n-nonyl isobutyl cyclohexane-1,2-dicarboxylate, isononyl isobutyl cyclohexane-1,2-dicarboxylate, 2-propylheptyl isobutyl cyclohexane-1,2-dicarboxylate, n-decyl isobutyl cyclohexane-1,2-dicarboxylate, isodecyl isobutyl cyclohexane-1,2-dicarboxylate, n-undecyl isobutyl cyclohexane-1,2-dicarboxylate, isoundecyl isobutyl cyclohexane-1,2-dicarboxylate, n-dodecyl isobutyl cyclohexane-1,2-dicarboxylate, isododecyl isobutyl cyclohexane-1,2-dicarboxylate, n-tridecyl isobutyl cyclohexane-1,2-dicarboxylate, isotridecyl isobutyl cyclohexane-1,2-dicarboxylate, n-hexyl glycol cyclohexane-1,2-dicarboxylate, isohexyl glycol cyclohexane-1,2-dicarboxylate, n-heptyl glycol cyclohexane-1,2-dicarboxylate, isoheptyl glycol cyclohexane-1,2-dicarboxylate, n-octyl glycol cyclohexane-1,2-dicarboxylate, isooctyl glycol cyclohexane-1,2-dicarboxylate, 2-ethylhexyl glycol cyclohexane-1,2-dicarboxylate, n-nonyl glycol cyclohexane-1,2-dicarboxylate, isononyl glycol cyclohexane-1,2-dicarboxylate, 2-propylheptyl glycol cyclohexane-1,2-dicarboxylate, n-decyl glycol cyclohexane-1,2-dicarboxylate, isodecyl glycol cyclohexane-1,2-dicarboxylate, n-undecyl glycol cyclohexane-1,2-dicarboxylate, isoundecyl glycol cyclohexane-1,2-dicarboxylate, n-dodecyl glycol cyclohexane-1,2-dicarboxylate, isododecyl glycol cyclohexane-1,2-dicarboxylate, n-tridecyl glycol cyclohexane-1,2-dicarboxylate, isotridecyl glycol cyclohexane-1,2-dicarboxylate, isohexyl n-hexyl cyclohexane-1,2-dicarboxylate, n-heptyl n-hexyl cyclohexane-1,2-dicarboxylate, isoheptyl n-hexyl cyclohexane-1,2-dicarboxylate, n-octyl n-hexyl cyclohexane-1,2-dicarboxylate, isooctyl n-hexyl cyclohexane-1,2-dicarboxylate, 2-ethylhexyl n-hexyl cyclohexane-1,2-dicarboxylate, n-nonyl n-hexyl cyclohexane-1,2-dicarboxylate, isononyl n-hexyl cyclohexane-1,2-dicarboxylate, 2-propylheptyl n-hexyl cyclohexane-1,2-dicarboxylate, n-decyl n-hexyl cyclohexane-1,2-dicarboxylate, isodecyl n-hexyl cyclohexane-1,2- dicarboxylate, n-undecyl n-hexyl cyclohexane-1,2-dicarboxylate, isoundecyl n-hexyl cyclohexane-1,2-dicarboxylate, n-dodecyl n-hexyl cyclohexane-1,2-dicarboxylate, isododecyl n-hexyl cyclohexane-1,2-dicarboxylate, n-tridecyl n-hexyl cyclohexane-1,2-dicarboxylate, isotridecyl n-hexyl cyclohexane-1,2-dicarboxylate, n-heptyl isohexyl cyclohexane-1,2-dicarboxylate, isoheptyl isohexyl cyclohexane-1,2-dicarboxylate, n-octyl isohexyl cyclohexane-1,2-dicarboxylate, isooctyl isohexyl cyclohexane-1,2-dicarboxylate, 2-ethylhexyl isohexyl cyclohexane-1,2-dicarboxylate, n-nonyl isohexyl cyclohexane-1,2-dicarboxylate, isononyl isohexyl cyclohexane-1,2-dicarboxylate, 2-propylheptyl isohexyl cyclohexane-1,2-dicarboxylate, n-decyl isohexyl cyclohexane-1,2-dicarboxylate, isodecyl isohexyl cyclohexane-1,2-dicarboxylate, n-undecyl isohexyl cyclohexane-1,2-dicarboxylate, isoundecyl isohexyl cyclohexane-1,2-dicarboxylate, n-dodecyl isohexyl cyclohexane-1,2-dicarboxylate, isododecyl isohexyl cyclohexane-1,2-dicarboxylate, n-tridecyl isohexyl cyclohexane-1,2-dicarboxylate, isotridecyl isohexyl cyclohexane-1,2-dicarboxylate, isoheptyl n-heptyl cyclohexane-1,2-dicarboxylate, n-octyl n-heptyl cyclohexane-1,2-dicarboxylate, isooctyl n-heptyl cyclohexane-1,2-dicarboxylate, 2-ethylhexyl n-heptyl cyclohexane-1,2-dicarboxylate, n-nonyl n-heptyl cyclohexane-1,2-dicarboxylate, isononyl n-heptyl cyclohexane-1,2-dicarboxylate, 2-propylheptyl n-heptyl cyclohexane-1,2-dicarboxylate, n-decyl n-heptyl cyclohexane-1,2-dicarboxylate, isodecyl n-heptyl cyclohexane-1,2-dicarboxylate, n-undecyl n-heptyl cyclohexane-1,2-dicarboxylate, isoundecyl n-heptyl cyclohexane-1,2-dicarboxylate, n-dodecyl n-heptyl cyclohexane-1,2-dicarboxylate, isododecyl n-heptyl cyclohexane-1,2-dicarboxylate, n-tridecyl n-heptyl cyclohexane-1,2-dicarboxylate, isotridecyl n-heptyl cyclohexane-1,2-dicarboxylate, n-octyl isoheptyl cyclohexane-1,2-dicarboxylate, isooctyl isoheptyl cyclohexane-1,2-dicarboxylate, 2-ethylhexyl isoheptyl cyclohexane-1,2-dicarboxylate, n-nonyl isoheptyl cyclohexane-1,2-dicarboxylate, isononyl isoheptyl cyclohexane-1,2-dicarboxylate, 2-propylheptyl isoheptyl cyclohexane-1,2-dicarboxylate, n-decyl isoheptyl cyclohexane-1,2-dicarboxylate, isodecyl isoheptyl cyclohexane-1,2-dicarboxylate, n-undecyl isoheptyl cyclohexane-1,2-dicarboxylate, isoundecyl isoheptyl cyclohexane-1,2-dicarboxylate, n-dodecyl isoheptyl cyclohexane-1,2-dicarboxylate, isododecyl isoheptyl cyclohexane-1,2-dicarboxylate, n-tridecyl isoheptyl cyclohexane-1,2-dicarboxylate, isotridecyl isoheptyl cyclohexane-1,2-dicarboxylate, isooctyl n-octyl cyclohexane-1,2-dicarboxylate, 2-ethylhexyl n-octyl cyclohexane-1,2-dicarboxylate, n-nonyl n-octyl cyclohexane-1,2-dicarboxylate, isononyl n-octyl cyclohexane-1,2-dicarboxylate, 2-propylheptyl n-octyl cyclohexane-1,2-dicarboxylate, n-decyl n-octyl cyclohexane-1,2-dicarboxylate, isodecyl n-octyl cyclohexane-1,2-dicarboxylate, n-undecyl n-octyl cyclohexane-1,2-dicarboxylate, isoundecyl n-octyl cyclohexane-1,2-dicarboxylate, n-dodecyl n-octyl cyclohexane-1,2-dicarboxylate, isododecyl n-octyl cyclohexane-1,2-dicarboxylate, n-tridecyl n-octyl cyclohexane-1,2-dicarboxylate, isotridecyl n-octyl cyclohexane-1,2-dicarboxylate, 2-ethylhexyl isooctyl cyclohexane-1,2-dicarboxylate, n-nonyl isooctyl cyclohexane-1,2-dicarboxylate, isononyl isooctyl cyclohexane-1,2-dicarboxylate, 2-propylheptyl isooctyl cyclohexane-1,2-dicarboxylate, n-decyl isooctyl cyclohexane-1,2-dicarboxylate, isodecyl isooctyl cyclohexane-1,2-dicarboxylate, n-undecyl isooctyl cyclohexane-1,2-dicarboxylate, isoundecyl isooctyl cyclohexane-1,2-dicarboxylate, n-dodecyl isooctyl cyclohexane-1,2-dicarboxylate, isododecyl isooctyl cyclohexane-1,2-dicarboxylate, n-tridecyl isooctyl cyclohexane-1,2-dicarboxylate, isotridecyl isooctyl cyclohexane-1,2-dicarboxylate, n-nonyl 2-ethylhexyl cyclohexane-1,2-dicarboxylate, isononyl 2-ethylhexyl cyclohexane-1,2-dicarboxylate, 2-propylheptyl 2-ethylhexyl cyclohexane-1,2-dicarboxylate, n-decyl 2-ethylhexyl cyclohexane-1,2-dicarboxylate, isodecyl 2-ethylhexyl cyclohexane-1,2-dicarboxylate, n-undecyl 2-ethylhexyl cyclohexane-1,2-dicarboxylate, isoundecyl 2-ethylhexyl cyclohexane-1,2-dicarboxylate, n-dodecyl 2-ethylhexyl cyclohexane-1,2-dicarboxylate, isododecyl 2-ethylhexyl cyclohexane-1,2-dicarboxylate, n-tridecyl 2-ethylhexyl cyclohexane-1,2-dicarboxylate, isotridecyl 2-ethylhexyl cyclohexane-1,2-dicarboxylate, isononyl n-nonyl cyclohexane-1,2-dicarboxylate, 2-propylheptyl n-nonyl cyclohexane-1,2-dicarboxylate, n-decyl n-nonyl cyclohexane-1,2-dicarboxylate, isodecyl n-nonyl cyclohexane-1,2-dicarboxylate, n-undecyl n-nonyl cyclohexane-1,2-dicarboxylate, isoundecyl n-nonyl cyclohexane-1,2-dicarboxylate, n-dodecyl n-nonyl cyclohexane-1,2-dicarboxylate, isododecyl n-nonyl cyclohexane-1,2-dicarboxylate, n-tridecyl n-nonyl cyclohexane-1,2-dicarboxylate, isotridecyl n-nonyl cyclohexane-1,2-dicarboxylate, 2-propylheptyl isononyl cyclohexane-1,2-dicarboxylate, n-decyl isononyl cyclohexane-1,2-dicarboxylate, isodecyl isononyl cyclohexane-1,2-dicarboxylate, n-undecyl isononyl cyclohexane-1,2-dicarboxylate, isoundecyl isononyl cyclohexane-1,2-dicarboxylate, n-dodecyl isononyl cyclohexane-1,2-dicarboxylate, isododecyl isononyl cyclohexane-1,2-dicarboxylate, n-tridecyl isononyl cyclohexane-1,2-dicarboxylate, isotridecyl isononyl cyclohexane-1,2-dicarboxylate, n-decyl 2-propylheptyl cyclohexane-1,2-dicarboxylate, isodecyl 2-propylheptyl cyclohexane-1,2-dicarboxylate, n-undecyl 2-propylheptyl cyclohexane-1,2-dicarboxylate, isoundecyl 2-propylheptyl cyclohexane-1,2-dicarboxylate, n-dodecyl 2-propylheptyl cyclohexane-1,2-dicarboxylate, isododecyl 2-propylheptyl cyclohexane-1,2-dicarboxylate, n-tridecyl 2-propylheptyl cyclohexane-1,2-dicarboxylate, isotridecyl 2-propylheptyl cyclohexane-1,2-dicarboxylate, isodecyl n-decyl cyclohexane-1,2-dicarboxylate, n-undecyl n-decyl cyclohexane-1,2-dicarboxylate, isoundecyl n-decyl cyclohexane-1,2-dicarboxylate, n-dodecyl n-decyl cyclohexane-1,2-dicarboxylate, isododecyl n-decyl cyclohexane-1,2-dicarboxylate, n-tridecyl n-decyl cyclohexane-1,2-dicarboxylate, isotridecyl n-decyl cyclohexane-1,2-dicarboxylate, n-undecyl isodecyl cyclohexane-1,2-dicarboxylate, isoundecyl isodecyl cyclohexane-1,2-dicarboxylate, n-dodecyl isodecyl cyclohexane-1,2-dicarboxylate, isododecyl isodecyl cyclohexane-1,2-dicarboxylate, n-tridecyl isodecyl cyclohexane-1,2-dicarboxylate, isotridecyl isodecyl cyclohexane-1,2-dicarboxylate, isoundecyl n-undecyl cyclohexane-1,2-dicarboxylate, n-dodecyl n-undecyl cyclohexane-1,2-dicarboxylate, isododecyl n-undecyl cyclohexane-1,2-dicarboxylate, n-tridecyl n-undecyl cyclohexane-1,2-dicarboxylate, isotridecyl n-undecyl cyclohexane-1,2-dicarboxylate, n-dodecyl isoundecyl cyclohexane-1,2-dicarboxylate, isododecyl isoundecyl cyclohexane-1,2- dicarboxylate, n-tridecyl isoundecyl cyclohexane-1,2-dicarboxylate, isotridecyl isoundecyl cyclohexane-1,2-dicarboxylate, isododecyl n-dodecyl cyclohexane-1,2-dicarboxylate, n-tridecyl n-dodecyl cyclohexane-1,2-dicarboxylate, isotridecyl n-dodecyl cyclohexane-1,2-dicarboxylate, n-tridecyl isododecyl cyclohexane-1,2-dicarboxylate, isotridecyl isododecyl cyclohexane-1,2-dicarboxylate, isotridecyl n-tridecyl cyclohexane-1,2-dicarboxylate, methyl cyclohexyl cyclohexane-1,2-dicarboxylate, ethyl cyclohexyl cyclohexane-1,2-dicarboxylate, n-propyl cyclohexyl cyclohexane-1,2-dicarboxylate, isopropyl cyclohexyl cyclohexane-1,2-dicarboxylate, n-butyl cyclohexyl cyclohexane-1,2-dicarboxylate, tert-butyl cyclohexyl cyclohexane-1,2-dicarboxylate, isobutyl cyclohexyl cyclohexane-1,2-dicarboxylate, glycol cyclohexyl cyclohexane-1,2-dicarboxylate, n-hexyl cyclohexyl cyclohexane-1,2-dicarboxylate, isohexyl cyclohexyl cyclohexane-1,2-dicarboxylate, n-heptyl cyclohexyl cyclohexane-1,2-dicarboxylate, isoheptyl cyclohexyl cyclohexane-1,2-dicarboxylate, n-octyl cyclohexyl cyclohexane-1,2-dicarboxylate, isooctyl cyclohexyl cyclohexane-1,2-dicarboxylate, 2-ethylhexyl cyclohexyl cyclohexane-1,2-dicarboxylate, n-nonyl cyclohexyl cyclohexane-1,2-dicarboxylate, isononyl cyclohexyl cyclohexane-1,2-dicarboxylate, 2-propylheptyl cyclohexyl cyclohexane-1,2-dicarboxylate, n-decyl cyclohexyl cyclohexane-1,2-dicarboxylate, isodecyl cyclohexyl cyclohexane-1,2-dicarboxylate, n-undecyl cyclohexyl cyclohexane-1,2-dicarboxylate, isoundecyl cyclohexyl cyclohexane-1,2-dicarboxylate, n-dodecyl cyclohexyl cyclohexane-1,2-dicarboxylate, isododecyl cyclohexyl cyclohexane-1,2-dicarboxylate, n-tridecyl cyclohexyl cyclohexane-1,2-dicarboxylate, isotridecyl cyclohexyl cyclohexane-1,2-dicarboxylate, methyl isopentyl cyclohexane-1,2-dicarboxylate, ethyl isopentyl cyclohexane-1,2-dicarboxylate, n-propyl isopentyl cyclohexane-1,2-dicarboxylate, isopropyl isopentyl cyclohexane-1,2-dicarboxylate, n-butyl isopentyl cyclohexane-1,2-dicarboxylate, tert-butyl isopentyl cyclohexane-1,2-dicarboxylate, isobutyl isopentyl cyclohexane-1,2-dicarboxylate, glycol isopentyl cyclohexane-1,2-dicarboxylate, n-hexyl isopentyl cyclohexane-1,2-dicarboxylate, isohexyl isopentyl cyclohexane-1,2-dicarboxylate, n-heptyl isopentyl cyclohexane-1,2-dicarboxylate, isoheptyl isopentyl cyclohexane-1,2-dicarboxylate, n-octyl isopentyl cyclohexane-1,2-dicarboxylate, isooctyl isopentyl cyclohexane-1,2-dicarboxylate, 2-ethylhexyl isopentyl cyclohexane-1,2-dicarboxylate, n-nonyl isopentyl cyclohexane-1,2-dicarboxylate, isononyl isopentyl cyclohexane-1,2-dicarboxylate, 2-propylheptyl isopentyl cyclohexane-1,2-dicarboxylate, n-decyl isopentyl cyclohexane-1,2-dicarboxylate, isodecyl isopentyl cyclohexane-1,2-dicarboxylate, n-undecyl isopentyl cyclohexane-1,2-dicarboxylate, isoundecyl isopentyl cyclohexane-1,2-dicarboxylate, n-dodecyl isopentyl cyclohexane-1,2-dicarboxylate, isododecyl isopentyl cyclohexane-1,2-dicarboxylate, n-tridecyl isopentyl cyclohexane-1,2-dicarboxylate, isotridecyl isopentyl cyclohexane-1,2-dicarboxylate, methyl n-pentyl cyclohexane-1,2-dicarboxylate, ethyl n-pentyl cyclohexane-1,2-dicarboxylate, n-propyl n-pentyl cyclohexane-1,2-dicarboxylate, isopropyl n-pentyl cyclohexane-1,2-dicarboxylate, n-butyl n-pentyl cyclohexane-1,2-dicarboxylate, tert-butyl n-pentyl cyclohexane-1,2-dicarboxylate, isobutyl n-pentyl cyclohexane-1,2-dicarboxylate, glycol n-pentyl cyclohexane-1,2-dicarboxylate, n-hexyl n-pentyl cyclohexane-1,2-dicarboxylate, isohexyl n-pentyl cyclohexane-1,2-dicarboxylate, n-heptyl n-pentyl cyclohexane-1,2-dicarboxylate, isoheptyl n-pentyl cyclohexane-1,2-dicarboxylate, n-octyl n-pentyl cyclohexane-1,2-dicarboxylate, isooctyl n-pentyl cyclohexane-1,2-dicarboxylate, 2-ethylhexyl n-pentyl cyclohexane-1,2-dicarboxylate, n-nonyl n-pentyl cyclohexane-1,2-dicarboxylate, isononyl n-pentyl cyclohexane-1,2-dicarboxylate, 2-propylheptyl n-pentyl cyclohexane-1,2-dicarboxylate, n-decyl n-pentyl cyclohexane-1,2-dicarboxylate, isodecyl n-pentyl cyclohexane-1,2-dicarboxylate, n-undecyl n-pentyl cyclohexane-1,2-dicarboxylate, isoundecyl n-pentyl cyclohexane-1,2-dicarboxylate, n-dodecyl n-pentyl cyclohexane-1,2-dicarboxylate, isododecyl n-pentyl cyclohexane-1,2-dicarboxylate, n-tridecyl n-pentyl cyclohexane-1,2-dicarboxylate, isotridecyl n-pentyl cyclohexane-1,2-dicarboxylate;

mixed esters of cyclohexane-1,3-dicarboxylic acid with $C_1$- to $C_{13}$-alcohols, such as, for example, ethyl methyl cyclohexane-1,3-dicarboxylate, n-propyl methyl cyclohexane-1,3-dicarboxylate, isopropyl methyl cyclohexane-1,3-dicarboxylate, n-butyl methyl cyclohexane-1,3-dicarboxylate, tert-butyl methyl cyclohexane-1,3-dicarboxylate, isobutyl methyl cyclohexane-1,3-dicarboxylate, glycol methyl cyclohexane-1,3-dicarboxylate, n-hexyl methyl cyclohexane-1,3-dicarboxylate, isohexyl methyl cyclohexane-1,3-dicarboxylate, n-heptyl methyl cyclohexane-1,3-dicarboxylate, isoheptyl methyl cyclohexane-1,3-dicarboxylate, n-octyl methyl cyclohexane-1,3-dicarboxylate, isooctyl methyl cyclohexane-1,3-dicarboxylate, 2-ethylhexyl methyl cyclohexane-1,3-dicarboxylate, n-nonyl methyl cyclohexane-1,3-dicarboxylate, isononyl methyl cyclohexane-1,3-dicarboxylate, 2-propylheptyl methyl cyclohexane-1,3-dicarboxylate, n-decyl methyl cyclohexane-1,3-dicarboxylate, isodecyl methyl cyclohexane-1,3-dicarboxylate, n-undecyl methyl cyclohexane-1,3-dicarboxylate, isoundecyl methyl cyclohexane-1,3-dicarboxylate, n-dodecyl methyl cyclohexane-1,3-dicarboxylate, isododecyl methyl cyclohexane-1,3-dicarboxylate, n-tridecyl methyl cyclohexane-1,3-dicarboxylate, isotridecyl methyl cyclohexane-1,3-dicarboxylate, n-propyl ethyl cyclohexane-1,3-dicarboxylate, isopropyl ethyl cyclohexane-1,3-dicarboxylate, n-butyl ethyl cyclohexane-1,3-dicarboxylate, tert-butyl ethyl cyclohexane-1,3-dicarboxylate, isobutyl ethyl cyclohexane-1,3-dicarboxylate, glycol ethyl cyclohexane-1,3-dicarboxylate, n-hexyl ethyl cyclohexane-1,3-dicarboxylate, isohexyl ethyl cyclohexane-1,3-dicarboxylate, n-heptyl ethyl cyclohexane-1,3-dicarboxylate, isoheptyl ethyl cyclohexane-1,3-dicarboxylate, n-octyl ethyl cyclohexane-1,3-dicarboxylate, isooctyl ethyl cyclohexane-1,3-dicarboxylate, 2-ethylhexyl ethyl cyclohexane-1,3-dicarboxylate, n-nonyl ethyl cyclohexane-1,3-dicarboxylate, isononyl ethyl cyclohexane-1,3-dicarboxylate, 2-propylheptyl ethyl cyclohexane-1,3-dicarboxylate, n-decyl ethyl cyclohexane-1,3-dicarboxylate, isodecyl ethyl cyclohexane-1,3-dicarboxylate, n-undecyl ethyl cyclohexane-1,3-dicarboxylate, isoundecyl ethyl cyclohexane-1,3-dicarboxylate, n-dodecyl ethyl cyclohexane-1,3-dicarboxylate, isododecyl ethyl cyclohexane-1,3-dicarboxylate, n-tridecyl ethyl cyclohexane-1,3-dicarboxylate, isotridecyl ethyl cyclohexane-1,3-dicarboxylate, isopropyl n-propyl cyclohexane-1,3-dicarboxylate, n-butyl n-propyl cyclohexane-1,3-dicarboxylate, tert-butyl n-propyl cyclohexane-1,3-dicarboxylate, isobutyl n-propyl cyclohexane-1,3-dicarboxylate, glycol n-propyl cyclohexane-1,3-dicarboxylate, n-hexyl n-propyl cyclohexane-1,3-dicarboxylate, isohexyl n-propyl cyclohexane-1,3-dicarboxylate, n-heptyl n-propyl cyclohexane-1,3-dicarboxylate, isoheptyl n-propyl cyclohexane-1,3-dicarboxylate, n-octyl n-propyl cyclohexane-1,3-dicarboxylate, isooctyl n-propyl cyclohexane-1,3-dicarboxylate, 2-ethylhexyl n-propyl cyclohexane-1,3-dicarboxylate, n-nonyl n-propyl cyclohexane-1,3-dicarboxylate, isononyl n-propyl cyclohexane-1,3-dicarboxylate, 2-propylheptyl n-propyl cyclohexane-1,3-dicarboxylate, n-decyl n-propyl cyclohexane-1,3-dicarboxylate, isodecyl n-propyl cyclohexane-1,3-dicarboxylate, n-undecyl n-propyl cyclohexane-1,3-dicarboxylate, isoundecyl n-propyl cyclohexane-1,3-dicarboxylate, n-dodecyl n-propyl cyclohexane-1,3-dicarboxylate, isododecyl n-propyl cyclohexane-1,3-dicarboxylate, n-tridecyl n-propyl cyclohexane-1,3-dicarboxylate, isotridecyl n-propyl cyclohexane-1,3-dicarboxylate, n-butyl isopropyl cyclohexane-1,3-dicarboxylate, tert-butyl isopropyl cyclohexane-1,3-dicarboxylate, isobutyl isopropyl cyclohexane-1,3-dicarboxylate, glycol isopropyl cyclohexane-1,3-dicarboxylate, n-hexyl isopropyl cyclohexane-1,3-dicarboxylate, isohexyl isopropyl cyclohexane-1,3-dicarboxylate, n-heptyl isopropyl cyclohexane-1,3-dicarboxylate, isoheptyl isopropyl cyclohexane-1,3-dicarboxylate, n-octyl isopropyl cyclohexane-1,3-dicarboxylate, isooctyl isopropyl cyclohexane-1,3-dicarboxylate, 2-ethylhexyl isopropyl cyclohexane-1,3-dicarboxylate, n-nonyl isopropyl cyclohexane-1,3-dicarboxylate, isononyl isopropyl cyclohexane-1,3-dicarboxylate, 2-propylheptyl isopropyl cyclohexane-1,3-dicarboxylate, n-decyl isopropyl cyclohexane-1,3-dicarboxylate, isodecyl isopropyl cyclohexane-1,3-dicarboxylate, n-undecyl isopropyl cyclohexane-1,3-dicarboxylate, isoundecyl isopropyl cyclohexane-1,3-dicarboxylate, n-dodecyl isopropyl cyclohexane-1,3-dicarboxylate, isododecyl isopropyl cyclohexane-1,3-dicarboxylate, n-tridecyl isopropyl cyclohexane-1,3-dicarboxylate, isotridecyl isopropyl cyclohexane-1,3-dicarboxylate, tert-butyl n-butyl cyclohexane-1,3-dicarboxylate, isobutyl n-butyl cyclohexane-1,3-dicarboxylate, glycol n-butyl cyclohexane-1,3-dicarboxylate, n-hexyl n-butyl cyclohexane-1,3-dicarboxylate, isohexyl n-butyl cyclohexane-1,3-dicarboxylate, n-heptyl n-butyl cyclohexane-1,3-dicarboxylate, isoheptyl n-butyl cyclohexane-1,3-dicarboxylate, n-octyl n-butyl cyclohexane-1,3-dicarboxylate, isooctyl n-butyl cyclohexane-1,3-dicarboxylate, 2-ethylhexyl n-butyl cyclohexane-1,3-dicarboxylate, n-nonyl n-butyl cyclohexane-1,3-dicarboxylate, isononyl n-butyl cyclohexane-1,3-dicarboxylate, 2-propylheptyl n-butyl cyclohexane-1,3-dicarboxylate, n-decyl n-butyl cyclohexane-1,3-dicarboxylate, isodecyl n-butyl cyclohexane-1,3-dicarboxylate, n-undecyl n-butyl cyclohexane-1,3-dicarboxylate, isoundecyl n-butyl cyclohexane-1,3-dicarboxylate, n-dodecyl n-butyl cyclohexane-1,3-dicarboxylate, isododecyl n-butyl cyclohexane-1,3-dicarboxylate, n-tridecyl n-butyl cyclohexane-1,3-dicarboxylate, isotridecyl n-butyl cyclohexane-1,3-dicarboxylate, isobutyl tert-butyl cyclohexane-1,3-dicarboxylate, glycol tert-butyl cyclohexane-1,3-dicarboxylate, n-hexyl tert-butyl cyclohexane-1,3-dicarboxylate, isohexyl tert-butyl cyclohexane-1,3-dicarboxylate, n-heptyl tert-butyl cyclohexane-1,3-dicarboxylate, isoheptyl tert-butyl cyclohexane-1,3-dicarboxylate, n-octyl tert-butyl cyclohexane-1,3-dicarboxylate, isooctyl tert-butyl cyclohexane-1,3-dicarboxylate, 2-ethylhexyl tert-butyl cyclohexane-1,3-dicarboxylate, n-nonyl tert-butyl cyclohexane-1,3-dicarboxylate, isononyl tert-butyl cyclohexane-1,3-dicarboxylate, 2-propylheptyl tert-butyl cyclohexane-1,3-dicarboxylate, n-decyl tert-butyl cyclohexane-1,3-dicarboxylate, isodecyl tert-butyl cyclohexane-1,3-dicarboxylate, n-undecyl tert-butyl cyclohexane-1,3-dicarboxylate, isoundecyl tert-butyl cyclohexane-1,3-dicarboxylate, n-dodecyl tert-butyl cyclohexane-1,3-dicarboxylate, isododecyl tert-butyl cyclohexane-1,3-dicarboxylate, n-tridecyl tert-butyl cyclohexane-1,3-dicarboxylate, isotridecyl tert-butyl cyclohexane-1,3-dicarboxylate, glycol isobutyl cyclohexane-1,3-dicarboxylate, n-hexyl isobutyl cyclohexane-1,3-dicarboxylate, isohexyl isobutyl cyclohexane-1,3-dicarboxylate, n-heptyl isobutyl cyclohexane-1,3-dicarboxylate, isoheptyl isobutyl cyclohexane-1,3-dicarboxylate, n-octyl isobutyl cyclohexane-1,3-dicarboxylate, isooctyl isobutyl cyclohexane-1,3-dicarboxylate, 2-ethylhexyl isobutyl cyclohexane-1,3-dicarboxylate, n-nonyl isobutyl cyclohexane-1,3-dicarboxylate, isononyl isobutyl cyclohexane-1,3-dicarboxylate, 2-propylheptyl isobutyl cyclohexane-1,3-dicarboxylate, n-decyl isobutyl cyclohexane-1,3-dicarboxylate, isodecyl isobutyl cyclohexane-1,3-dicarboxylate, n-undecyl isobutyl cyclohexane-1,3-dicarboxylate, isoundecyl isobutyl cyclohexane-1,3-dicarboxylate, n-dodecyl isobutyl cyclohexane-1,3-dicarboxylate, isododecyl isobutyl cyclohexane-1,3-dicarboxylate, n-tridecyl isobutyl cyclohexane-1,3-dicarboxylate, isotridecyl isobutyl cyclohexane-1,3-dicarboxylate, n-hexyl glycol cyclohexane-1,3-dicarboxylate, isohexyl glycol cyclohexane-1,3-dicarboxylate, n-heptyl glycol cyclohexane-1,3-dicarboxylate, isoheptyl glycol cyclohexane-1,3-dicarboxylate, n-octyl glycol cyclohexane-1,3-dicarboxylate, isooctyl glycol cyclohexane-1,3-dicarboxylate, 2-ethylhexyl glycol cyclohexane-1,3-dicarboxylate, n-nonyl glycol cyclohexane-1,3-dicarboxylate, isononyl glycol cyclohexane-1,3-dicarboxylate, 2-propylheptyl glycol cyclohexane-1,3-dicarboxylate, n-decyl glycol cyclohexane-1,3-dicarboxylate, isodecyl glycol cyclohexane-1,3-dicarboxylate, n-undecyl glycol cyclohexane-1,3-dicarboxylate, isoundecyl glycol cyclohexane-1,3-dicarboxylate, n-dodecyl glycol cyclohexane-1,3-dicarboxylate, isododecyl glycol cyclohexane-1,3-dicarboxylate, n-tridecyl glycol cyclohexane-1,3-dicarboxylate, isotridecyl glycol cyclohexane-1,3-dicarboxylate, isohexyl n-hexyl cyclohexane-1,3-dicarboxylate, n-heptyl n-hexyl cyclohexane-1,3-dicarboxylate, isoheptyl n-hexyl cyclohexane-1,3-dicarboxylate, n-octyl n-hexyl cyclohexane-1,3-dicarboxylate, isooctyl n-hexyl cyclohexane-1,3-dicarboxylate, 2-ethylhexyl n-hexyl cyclohexane-1,3-dicarboxylate, n-nonyl n-hexyl cyclohexane-1,3-dicarboxylate, isononyl n-hexyl cyclohexane-1,3-dicarboxylate, 2-propylheptyl n-hexyl cyclohexane-1,3-dicarboxylate, n-decyl n-hexyl cyclohexane-1,3-dicarboxylate, isodecyl n-hexyl cyclohexane-1,3-dicarboxylate, n-undecyl n-hexyl cyclohexane-1,3-dicarboxylate, isoundecyl n-hexyl cyclohexane-1,3-dicarboxylate, n-dodecyl n-hexyl cyclohexane-1,3-dicarboxylate, isododecyl n-hexyl cyclohexane-1,3-dicarboxylate, n-tridecyl n-hexyl cyclohexane-1,3-dicarboxylate, isotridecyl n-hexyl cyclohexane-1,3-dicarboxylate, n-heptyl isohexyl cyclohexane-1,3-dicarboxylate, isoheptyl isohexyl cyclohexane-1,3-dicarboxylate, n-octyl isohexyl cyclohexane-1,3-dicarboxylate, isooctyl isohexyl cyclohexane-1,3- dicarboxylate, 2-ethylhexyl isohexyl cyclohexane-1,3-dicarboxylate, n-nonyl isohexyl cyclohexane-1,3-dicarboxylate, isononyl isohexyl cyclohexane-1,3-dicarboxylate, 2-propylheptyl isohexyl cyclohexane-1,3-dicarboxylate, n-decyl isohexyl cyclohexane-1,3-dicarboxylate, isodecyl isohexyl cyclohexane-1,3-dicarboxylate, n-undecyl isohexyl cyclohexane-1,3-dicarboxylate, isoundecyl isohexyl cyclohexane-1,3-dicarboxylate, n-dodecyl isohexyl cyclohexane-1,3-dicarboxylate, isododecyl isohexyl cyclohexane-1,3-dicarboxylate, n-tridecyl isohexyl cyclohexane-1,3-dicarboxylate, isotridecyl isohexyl cyclohexane-1,3-dicarboxylate, isoheptyl n-heptyl cyclohexane-1,3-dicarboxylate, n-octyl n-heptyl cyclohexane-1,3-dicarboxylate, isooctyl n-heptyl cyclohexane-1,3-dicarboxylate, 2-ethylhexyl n-heptyl cyclohexane-1,3-dicarboxylate, n-nonyl n-heptyl cyclohexane-1,3-dicarboxylate, isononyl n-heptyl cyclohexane-1,3-dicarboxylate, 2-propylheptyl n-heptyl cyclohexane-1,3-dicarboxylate, n-decyl n-heptyl cyclohexane-1,3-dicarboxylate, isodecyl n-heptyl cyclohexane-1,3-dicarboxylate, n-undecyl n-heptyl cyclohexane-1,3-dicarboxylate, isoundecyl n-heptyl cyclohexane-1,3-dicarboxylate, n-dodecyl n-heptyl cyclohexane-1,3-dicarboxylate, isododecyl n-heptyl cyclohexane-1,3-dicarboxylate, n-tridecyl n-heptyl cyclohexane-1,3-dicarboxylate, isotridecyl n-heptyl cyclohexane-1,3-dicarboxylate, n-octyl isoheptyl cyclohexane-1,3-dicarboxylate, isooctyl isoheptyl cyclohexane-1,3-dicarboxylate, 2-ethylhexyl isoheptyl cyclohexane-1,3-dicarboxylate, n-nonyl isoheptyl cyclohexane-1,3-dicarboxylate, isononyl isoheptyl cyclohexane-1,3-dicarboxylate, 2-propylheptyl isoheptyl cyclohexane-1,3-dicarboxylate, n-decyl isoheptyl cyclohexane-1,3-dicarboxylate, isodecyl isoheptyl cyclohexane-1,3-dicarboxylate, n-undecyl isoheptyl cyclohexane-1,3-dicarboxylate, isoundecyl isoheptyl cyclohexane-1,3-dicarboxylate, n-dodecyl isoheptyl cyclohexane-1,3-dicarboxylate, isododecyl isoheptyl cyclohexane-1,3-dicarboxylate, n-tridecyl isoheptyl cyclohexane-1,3-dicarboxylate, isotridecyl isoheptyl cyclohexane-1,3-dicarboxylate, isooctyl n-octyl cyclohexane-1,3-dicarboxylate, 2-ethylhexyl n-octyl cyclohexane-1,3-dicarboxylate, n-nonyl n-octyl cyclohexane-1,3-dicarboxylate, isononyl n-octyl cyclohexane-1,3-dicarboxylate, 2-propylheptyl n-octyl cyclohexane-1,3-dicarboxylate, n-decyl n-octyl cyclohexane-1,3-dicarboxylate, isodecyl n-octyl cyclohexane-1,3-dicarboxylate, n-undecyl n-octyl cyclohexane-1,3-dicarboxylate, isoundecyl n-octyl cyclohexane-1,3-dicarboxylate, n-dodecyl n-octyl cyclohexane-1,3-dicarboxylate, isododecyl n-octyl cyclohexane-1,3-dicarboxylate, n-tridecyl n-octyl cyclohexane-1,3-dicarboxylate, isotridecyl n-octyl cyclohexane-1,3-dicarboxylate, 2-ethylhexyl isooctyl cyclohexane-1,3-dicarboxylate, n-nonyl isooctyl cyclohexane-1,3-dicarboxylate, isononyl isooctyl cyclohexane-1,3-dicarboxylate, 2-propylheptyl isooctyl cyclohexane-1,3-dicarboxylate, n-decyl isooctyl cyclohexane-1,3-dicarboxylate, isodecyl isooctyl cyclohexane-1,3-dicarboxylate, n-undecyl isooctyl cyclohexane-1,3-dicarboxylate, isoundecyl isooctyl cyclohexane-1,3-dicarboxylate, n-dodecyl isooctyl cyclohexane-1,3-dicarboxylate, isododecyl isooctyl cyclohexane-1,3-dicarboxylate, n-tridecyl isooctyl cyclohexane-1,3-dicarboxylate, isotridecyl isooctyl cyclohexane-1,3-dicarboxylate, n-nonyl 2-ethylhexyl cyclohexane-1,3-dicarboxylate, isononyl 2-ethylhexyl cyclohexane-1,3-dicarboxylate, 2-propylheptyl 2-ethylhexyl cyclohexane-1,3-dicarboxylate, n-decyl 2-ethylhexyl cyclohexane-1,3-dicarboxylate, isodecyl 2-ethylhexyl cyclohexane-1,3-dicarboxylate, n-undecyl 2-ethylhexyl cyclohexane-1,3-dicarboxylate, isoundecyl 2-ethylhexyl cyclohexane-1,3-dicarboxylate, n-dodecyl 2-ethylhexyl cyclohexane-1,3-dicarboxylate, isododecyl 2-ethylhexyl cyclohexane-1,3-dicarboxylate, n-tridecyl 2-ethylhexyl cyclohexane-1,3-dicarboxylate, isotridecyl 2-ethylhexyl cyclohexane-1,3-dicarboxylate, isononyl n-nonyl cyclohexane-1,3-dicarboxylate, 2-propylheptyl n-nonyl cyclohexane-1,3-dicarboxylate, n-decyl n-nonyl cyclohexane-1,3-dicarboxylate, isodecyl n-nonyl cyclohexane-1,3-dicarboxylate, n-undecyl n-nonyl cyclohexane-1,3-dicarboxylate, isoundecyl n-nonyl cyclohexane-1,3-dicarboxylate, n-dodecyl n-nonyl cyclohexane-1,3-dicarboxylate, isododecyl n-nonyl cyclohexane-1,3-dicarboxylate, n-tridecyl n-nonyl cyclohexane-1,3-dicarboxylate, isotridecyl n-nonyl cyclohexane-1,3-dicarboxylate, 2-propylheptyl isononyl cyclohexane-1,3-dicarboxylate, n-decyl isononyl cyclohexane-1,3-dicarboxylate, isodecyl isononyl cyclohexane-1,3-dicarboxylate, n-undecyl isononyl cyclohexane-1,3-dicarboxylate, isoundecyl isononyl cyclohexane-1,3-dicarboxylate, n-dodecyl isononyl cyclohexane-1,3-dicarboxylate, isododecyl isononyl cyclohexane-1,3-dicarboxylate, n-tridecyl isononyl cyclohexane-1,3-dicarboxylate, isotridecyl isononyl cyclohexane-1,3-dicarboxylate, n-decyl 2-propylheptyl cyclohexane-1,3-dicarboxylate, isodecyl 2-propylheptyl cyclohexane-1,3-dicarboxylate, n-undecyl 2-propylheptyl cyclohexane-1,3-dicarboxylate, isoundecyl 2-propylheptyl cyclohexane-1,3-dicarboxylate, n-dodecyl 2-propylheptyl cyclohexane-1,3-dicarboxylate, isododecyl 2-propylheptyl cyclohexane-1,3-dicarboxylate, n-tridecyl 2-propylheptyl cyclohexane-1,3-dicarboxylate, isotridecyl 2-propylheptyl cyclohexane-1,3-dicarboxylate, isodecyl n-decyl cyclohexane-1,3-dicarboxylate, n-undecyl n-decyl cyclohexane-1,3-dicarboxylate, isoundecyl n-decyl cyclohexane-1,3-dicarboxylate, n-dodecyl n-decyl cyclohexane-1,3-dicarboxylate, isododecyl n-decyl cyclohexane-1,3-dicarboxylate, n-tridecyl n-decyl cyclohexane-1,3-dicarboxylate, isotridecyl n-decyl cyclohexane-1,3-dicarboxylate, n-undecyl isodecyl cyclohexane-1,3-dicarboxylate, isoundecyl isodecyl cyclohexane-1,3-dicarboxylate, n-dodecyl isodecyl cyclohexane-1,3-dicarboxylate, isododecyl isodecyl cyclohexane-1,3-dicarboxylate, n-tridecyl isodecyl cyclohexane-1,3-dicarboxylate, isotridecyl isodecyl cyclohexane-1,3-dicarboxylate, isoundecyl n-undecyl cyclohexane-1,3-dicarboxylate, n-dodecyl n-undecyl cyclohexane-1,3-dicarboxylate, isododecyl n-undecyl cyclohexane-1,3-dicarboxylate, n-tridecyl n-undecyl cyclohexane-1,3-dicarboxylate, isotridecyl n-undecyl cyclohexane-1,3-dicarboxylate, n-dodecyl isoundecyl cyclohexane-1,3-dicarboxylate, isododecyl isoundecyl cyclohexane-1,3-dicarboxylate, n-tridecyl isoundecyl cyclohexane-1,3-dicarboxylate, isotridecyl isoundecyl cyclohexane-1,3-dicarboxylate, isododecyl n-dodecyl cyclohexane-1,3-dicarboxylate, n-tridecyl n-dodecyl cyclohexane-1,3-dicarboxylate, isotridecyl n-dodecyl cyclohexane-1,3-dicarboxylate, n-tridecyl isododecyl cyclohexane-1,3-dicarboxylate, isotridecyl isododecyl cyclohexane-1,3-dicarboxylate, isotridecyl n-tridecyl cyclohexane-1,3-dicarboxylate, methyl cyclohexyl cyclohexane-1,3-dicarboxylate, ethyl cyclohexyl cyclohexane-1,3- dicarboxylate, n-propyl cyclohexyl cyclohexane-1,3-dicarboxylate, isopropyl cyclohexyl cyclohexane-1,3-dicarboxylate, n-butyl cyclohexyl cyclohexane-1,3-dicarboxylate, tert-butyl cyclohexyl cyclohexane-1,3-dicarboxylate, isobutyl cyclohexyl cyclohexane-1,3-dicarboxylate, glycol cyclohexyl cyclohexane-1,3-dicarboxylate, n-hexyl cyclohexyl cyclohexane-1,3-dicarboxylate, isohexyl cyclohexyl cyclohexane-1,3-dicarboxylate, n-heptyl cyclohexyl cyclohexane-1,3-dicarboxylate, isoheptyl cyclohexyl cyclohexane-1,3-dicarboxylate, n-octyl cyclohexyl cyclohexane-1,3-dicarboxylate, isooctyl cyclohexyl cyclohexane-1,3-dicarboxylate, 2-ethylhexyl cyclohexyl cyclohexane-1,3-dicarboxylate, n-nonyl cyclohexyl cyclohexane-1,3-dicarboxylate, isononyl cyclohexyl cyclohexane-1,3-dicarboxylate, 2-propylheptyl cyclohexyl cyclohexane-1,3-dicarboxylate, n-decyl cyclohexyl cyclohexane-1,3-dicarboxylate, isodecyl cyclohexyl cyclohexane-1,3-dicarboxylate, n-undecyl cyclohexyl cyclohexane-1,3-dicarboxylate, isoundecyl cyclohexyl cyclohexane-1,3-dicarboxylate, n-dodecyl cyclohexyl cyclohexane-1,3-dicarboxylate, isododecyl cyclohexyl cyclohexane-1,3-dicarboxylate, n-tridecyl cyclohexyl cyclohexane-1,3-dicarboxylate, isotridecyl cyclohexyl cyclohexane-1,3-dicarboxylate, methyl isopentyl cyclohexane-1,3-dicarboxylate, ethyl isopentyl cyclohexane-1,3-dicarboxylate, n-propyl isopentyl cyclohexane-1,3-dicarboxylate, isopropyl isopentyl cyclohexane-1,3-dicarboxylate, n-butyl isopentyl cyclohexane-1,3-dicarboxylate, tert-butyl isopentyl cyclohexane-1,3-dicarboxylate, isobutyl isopentyl cyclohexane-1,3-dicarboxylate, glycol isopentyl cyclohexane-1,3-dicarboxylate, n-hexyl isopentyl cyclohexane-1,3-dicarboxylate, isohexyl isopentyl cyclohexane-1,3-dicarboxylate, n-heptyl isopentyl cyclohexane-1,3-dicarboxylate, isoheptyl isopentyl cyclohexane-1,3-dicarboxylate, n-octyl isopentyl cyclohexane-1,3-dicarboxylate, isooctyl isopentyl cyclohexane-1,3-dicarboxylate, 2-ethylhexyl isopentyl cyclohexane-1,3-dicarboxylate, n-nonyl isopentyl cyclohexane-1,3-dicarboxylate, isononyl isopentyl cyclohexane-1,3-dicarboxylate, 2-propylheptyl isopentyl cyclohexane-1,3-dicarboxylate, n-decyl isopentyl cyclohexane-1,3-dicarboxylate, isodecyl isopentyl cyclohexane-1,3-dicarboxylate, n-undecyl isopentyl cyclohexane-1,3-dicarboxylate, isoundecyl isopentyl cyclohexane-1,3-dicarboxylate, n-dodecyl isopentyl cyclohexane-1,3-dicarboxylate, isododecyl isopentyl cyclohexane-1,3-dicarboxylate, n-tridecyl isopentyl cyclohexane-1,3-dicarboxylate, isotridecyl isopentyl cyclohexane-1,3-dicarboxylate, methyl n-pentyl cyclohexane-1,3-dicarboxylate, ethyl n-pentyl cyclohexane-1,3-dicarboxylate, n-propyl n-pentyl cyclohexane-1,3-dicarboxylate, isopropyl n-pentyl cyclohexane-1,3-dicarboxylate, n-butyl n-pentyl cyclohexane-1,3-dicarboxylate, tert-butyl n-pentyl cyclohexane-1,3-dicarboxylate, isobutyl n-pentyl cyclohexane-1,3-dicarboxylate, glycol n-pentyl cyclohexane-1,3-dicarboxylate, n-hexyl n-pentyl cyclohexane-1,3-dicarboxylate, isohexyl n-pentyl cyclohexane-1,3-dicarboxylate, n-heptyl n-pentyl cyclohexane-1,3-dicarboxylate, isoheptyl n-pentyl cyclohexane-1,3-dicarboxylate, n-octyl n-pentyl cyclohexane-1,3-dicarboxylate, isooctyl n-pentyl cyclohexane-1,3-dicarboxylate, 2-ethylhexyl n-pentyl cyclohexane-1,3-dicarboxylate, n-nonyl n-pentyl cyclohexane-1,3-dicarboxylate, isononyl n-pentyl cyclohexane-1,3-dicarboxylate, 2-propylheptyl n-pentyl cyclohexane-1,3-dicarboxylate, n-decyl n-pentyl cyclohexane-1,3-dicarboxylate, isodecyl n-pentyl cyclohexane-1,3-dicarboxylate, n-undecyl n-pentyl cyclohexane-1,3-dicarboxylate, isoundecyl n-pentyl cyclohexane-1,3-dicarboxylate, n-dodecyl n-pentyl cyclohexane-1,3-dicarboxylate, isododecyl n-pentyl cyclohexane-1,3-dicarboxylate, n-tridecyl n-pentyl cyclohexane-1,3-dicarboxylate, isotridecyl n-pentyl cyclohexane-1,3-dicarboxylate;

mixed esters of cyclohexane-1,4-dicarboxylic acid with $C_1$- to $C_{13}$-alcohols, such as, for example, ethyl methyl cyclohexane-1,4-dicarboxylate, n-propyl methyl cyclohexane-1,4-dicarboxylate, isopropyl methyl cyclohexane-1,4-dicarboxylate, n-butyl methyl cyclohexane-1,4-dicarboxylate, tert-butyl methyl cyclohexane-1,4-dicarboxylate, isobutyl methyl cyclohexane-1,4-dicarboxylate, glycol methyl cyclohexane-1,4-dicarboxylate, n-hexyl methyl cyclohexane-1,4-dicarboxylate, isohexyl methyl cyclohexane-1,4-dicarboxylate, n-heptyl methyl cyclohexane-1,4-dicarboxylate, isoheptyl methyl cyclohexane-1,4-dicarboxylate, n-octyl methyl cyclohexane-1,4-dicarboxylate, isooctyl methyl cyclohexane-1,4-dicarboxylate, 2-ethylhexyl methyl cyclohexane-1,4-dicarboxylate, n-nonyl methyl cyclohexane-1,4-dicarboxylate, isononyl methyl cyclohexane-1,4-dicarboxylate, 2-propylheptyl methyl cyclohexane-1,4-dicarboxylate, n-decyl methyl cyclohexane-1,4-dicarboxylate, isodecyl methyl cyclohexane-1,4-dicarboxylate, n-undecyl methyl cyclohexane-1,4-dicarboxylate, isoundecyl methyl cyclohexane-1,4-dicarboxylate, n-dodecyl methyl cyclohexane-1,4-dicarboxylate, isododecyl methyl cyclohexane-1,4-dicarboxylate, n-tridecyl methyl cyclohexane-1,4-dicarboxylate, isotridecyl methyl cyclohexane-1,4-dicarboxylate, n-propyl ethyl cyclohexane-1,4-dicarboxylate, isopropyl ethyl cyclohexane-1,4-dicarboxylate, n-butyl ethyl cyclohexane-1,4-dicarboxylate, tert-butyl ethyl cyclohexane-1,4-dicarboxylate, isobutyl ethyl cyclohexane-1,4-dicarboxylate, glycol ethyl cyclohexane-1,4-dicarboxylate, n-hexyl ethyl cyclohexane-1,4-dicarboxylate, isohexyl ethyl cyclohexane-1,4-dicarboxylate, n-heptyl ethyl cyclohexane-1,4-dicarboxylate, isoheptyl ethyl cyclohexane-1,4-dicarboxylate, n-octyl ethyl cyclohexane-1,4-dicarboxylate, isooctyl ethyl cyclohexane-1,4-dicarboxylate, 2-ethylhexyl ethyl cyclohexane-1,4-dicarboxylate, n-nonyl ethyl cyclohexane-1,4-dicarboxylate, isononyl ethyl cyclohexane-1,4-dicarboxylate, 2-propylheptyl ethyl cyclohexane-1,4-dicarboxylate, n-decyl ethyl cyclohexane-1,4-dicarboxylate, isodecyl ethyl cyclohexane-1,4-dicarboxylate, n-undecyl ethyl cyclohexane-1,4-dicarboxylate, isoundecyl ethyl cyclohexane-1,4-dicarboxylate, n-dodecyl ethyl cyclohexane-1,4-dicarboxylate, isododecyl ethyl cyclohexane-1,4-dicarboxylate, n-tridecyl ethyl cyclohexane-1,4-dicarboxylate, isotridecyl ethyl cyclohexane-1,4-dicarboxylate, isopropyl n-propyl cyclohexane-1,4-dicarboxylate, n-butyl n-propyl cyclohexane-1,4-dicarboxylate, tert-butyl n-propyl cyclohexane-1,4-dicarboxylate, isobutyl n-propyl cyclohexane-1,4-dicarboxylate, glycol n-propyl cyclohexane-1,4-dicarboxylate, n-hexyl n-propyl cyclohexane-1,4-dicarboxylate, isohexyl n-propyl cyclohexane-1,4-dicarboxylate, n-heptyl n-propyl cyclohexane-1,4-dicarboxylate, isoheptyl n-propyl cyclohexane-1,4-dicarboxylate, n-octyl n-propyl cyclohexane-1,4-dicarboxylate, isooctyl n-propyl cyclohexane-1,4-dicarboxylate, 2-ethylhexyl n-propyl cyclohexane-1,4-dicarboxylate, n-nonyl n-propyl cyclohexane-1,4-dicarboxylate, isononyl n-propyl cyclohexane-1,4-dicarboxylate, 2-propylheptyl n-propyl cyclohexane-1,4-dicarboxylate, n-decyl n-propyl cyclohexane-1,4-dicarboxylate, isodecyl n-propyl cyclohexane-1,4-dicarboxylate, n-undecyl n-propyl cyclohexane-1,4-dicarboxylate, isoundecyl n-propyl cyclohexane-1,4-dicarboxylate, n-dodecyl n-propyl cyclohexane-1,4-dicarboxylate, isododecyl n-propyl cyclohexane-1,4-dicarboxylate, n-tridecyl n-propyl cyclohexane-1,4-dicarboxylate, isotridecyl n-propyl cyclohexane-1,4-dicarboxylate, n-butyl isopropyl cyclohexane-1,4-dicarboxylate, tert-butyl isopropyl cyclohexane-1,4-dicarboxylate, isobutyl isopropyl cyclohexane-1,4-dicarboxylate, glycol isopropyl cyclohexane-1,4-dicarboxylate, n-hexyl isopropyl cyclohexane-1,4-dicarboxylate, isohexyl isopropyl cyclohexane-1,4-dicarboxylate, n-heptyl isopropyl cyclohexane-1,4-dicarboxylate, isoheptyl isopropyl cyclohexane-1,4-dicarboxylate, n-octyl isopropyl cyclohexane-1,4-dicarboxylate, isooctyl isopropyl cyclohexane-1,4-dicarboxylate, 2-ethylhexyl isopropyl cyclohexane-1,4-dicarboxylate, n-nonyl isopropyl cyclohexane-1,4-dicarboxylate, isononyl isopropyl cyclohexane-1,4-dicarboxylate, 2-propylheptyl isopropyl cyclohexane-1,4-dicarboxylate, n-decyl isopropyl cyclohexane-1,4-dicarboxylate, isodecyl isopropyl cyclohexane-1,4-dicarboxylate, n-undecyl isopropyl cyclohexane-1,4-dicarboxylate, isoundecyl isopropyl cyclohexane-1,4-dicarboxylate, n-dodecyl isopropyl cyclohexane-1,4-dicarboxylate, isododecyl isopropyl cyclohexane-1,4-dicarboxylate, n-tridecyl isopropyl cyclohexane-1,4-dicarboxylate, isotridecyl isopropyl cyclohexane-1,4-dicarboxylate, tert-butyl n-butyl cyclohexane-1,4-dicarboxylate, isobutyl n-butyl cyclohexane-1,4-dicarboxylate, glycol n-butyl cyclohexane-1,4-dicarboxylate, n-hexyl n-butyl cyclohexane-1,4-dicarboxylate, isohexyl n-butyl cyclohexane-1,4-dicarboxylate, n-heptyl n-butyl cyclohexane-1,4-dicarboxylate, isoheptyl n-butyl cyclohexane-1,4-dicarboxylate, n-octyl n-butyl cyclohexane-1,4-dicarboxylate, isooctyl n-butyl cyclohexane-1,4-dicarboxylate, 2-ethylhexyl n-butyl cyclohexane-1,4-dicarboxylate, n-nonyl n-butyl cyclohexane-1,4-dicarboxylate, isononyl n-butyl cyclohexane-1,4-dicarboxylate, 2-propylheptyl n-butyl cyclohexane-1,4-dicarboxylate, n-decyl n-butyl cyclohexane-1,4-dicarboxylate, isodecyl n-butyl cyclohexane-1,4-dicarboxylate, n-undecyl n-butyl cyclohexane-1,4-dicarboxylate, isoundecyl n-butyl cyclohexane-1,4-dicarboxylate, n-dodecyl n-butyl cyclohexane-1,4-dicarboxylate, isododecyl n-butyl cyclohexane-1,4-dicarboxylate, n-tridecyl n-butyl cyclohexane-1,4-dicarboxylate, isotridecyl n-butyl cyclohexane-1,4-dicarboxylate, isobutyl tert-butyl cyclohexane-1,4-dicarboxylate, glycol tert-butyl cyclohexane-1,4-dicarboxylate, n-hexyl tert-butyl cyclohexane-1,4-dicarboxylate, isohexyl tert-butyl cyclohexane-1,4-dicarboxylate, n-heptyl tert-butyl cyclohexane-1,4-dicarboxylate, isoheptyl tert-butyl cyclohexane-1,4-dicarboxylate, n-octyl tert-butyl cyclohexane-1,4-dicarboxylate, isooctyl tert-butyl cyclohexane-1,4-dicarboxylate, 2-ethylhexyl tert-butyl cyclohexane-1,4-dicarboxylate, n-nonyl tert-butyl cyclohexane-1,4-dicarboxylate, isononyl tert-butyl cyclohexane-1,4-dicarboxylate, 2-propylheptyl tert-butyl cyclohexane-1,4-dicarboxylate, n-decyl tert-butyl cyclohexane-1,4-dicarboxylate, isodecyl tert-butyl cyclohexane-1,4-dicarboxylate, n-undecyl tert-butyl cyclohexane-1,4-dicarboxylate, isoundecyl tert-butyl cyclohexane-1,4-dicarboxylate, n-dodecyl tert-butyl cyclohexane-1,4-dicarboxylate, isododecyl tert-butyl cyclohexane-1,4-dicarboxylate, n-tridecyl tert-butyl cyclohexane-1,4-dicarboxylate, isotridecyl tert-butyl cyclohexane-1,4-dicarboxylate, glycol isobutyl cyclohexane-1,4-dicarboxylate, n-hexyl isobutyl cyclohexane-1,4-dicarboxylate, isohexyl isobutyl cyclohexane-1,4-dicarboxylate, n-heptyl isobutyl cyclohexane-1,4-dicarboxylate, isoheptyl isobutyl cyclohexane-1,4-dicarboxylate, n-octyl isobutyl cyclohexane-1,4-dicarboxylate, isooctyl isobutyl cyclohexane-1,4-dicarboxylate, 2-ethylhexyl isobutyl cyclohexane-1,4-dicarboxylate, n-nonyl isobutyl cyclohexane-1,4-dicarboxylate, isononyl isobutyl cyclohexane-1,4-dicarboxylate, 2-propylheptyl isobutyl cyclohexane-1,4-dicarboxylate, n-decyl isobutyl cyclohexane-1,4-dicarboxylate, isodecyl isobutyl cyclohexane-1,4-dicarboxylate, n-undecyl isobutyl cyclohexane-1,4-dicarboxylate, isoundecyl isobutyl cyclohexane-1,4-dicarboxylate, n-dodecyl isobutyl cyclohexane-1,4-dicarboxylate, isododecyl isobutyl cyclohexane-1,4-dicarboxylate, n-tridecyl isobutyl cyclohexane-1,4-dicarboxylate, isotridecyl isobutyl cyclohexane-1,4-dicarboxylate, n-hexyl glycol cyclohexane-1,4-dicarboxylate, isohexyl glycol cyclohexane-1,4-dicarboxylate, n-heptyl glycol cyclohexane-1,4-dicarboxylate, isoheptyl glycol cyclohexane-1,4-dicarboxylate, n-octyl glycol cyclohexane-1,4-dicarboxylate, isooctyl glycol cyclohexane-1,4-dicarboxylate, 2-ethylhexyl glycol cyclohexane-1,4-dicarboxylate, n-nonyl glycol cyclohexane-1,4-dicarboxylate, isononyl glycol cyclohexane-1,4-dicarboxylate, 2-propylheptyl glycol cyclohexane-1,4-dicarboxylate, n-decyl glycol cyclohexane-1,4-dicarboxylate, isodecyl glycol cyclohexane-1,4-dicarboxylate, n-undecyl glycol cyclohexane-1,4-dicarboxylate, isoundecyl glycol cyclohexane-1,4-dicarboxylate, n-dodecyl glycol cyclohexane-1,4-dicarboxylate, isododecyl glycol cyclohexane-1,4-dicarboxylate, n-tridecyl glycol cyclohexane-1,4-dicarboxylate, isotridecyl glycol cyclohexane-1,4-dicarboxylate, isohexyl n-hexyl cyclohexane-1,4-dicarboxylate, n-heptyl n-hexyl cyclohexane-1,4-dicarboxylate, isoheptyl n-hexyl cyclohexane-1,4-dicarboxylate, n-octyl n-hexyl cyclohexane-1,4-dicarboxylate, isooctyl n-hexyl cyclohexane-1,4-dicarboxylate, 2-ethylhexyl n-hexyl cyclohexane-1,4-dicarboxylate, n-nonyl n-hexyl cyclohexane-1,4-dicarboxylate, isononyl n-hexyl cyclohexane-1,4-dicarboxylate, 2-propylheptyl n-hexyl cyclohexane-1,4-dicarboxylate, n-decyl n-hexyl cyclohexane-1,4-dicarboxylate, isodecyl n-hexyl cyclohexane-1,4-dicarboxylate, n-undecyl n-hexyl cyclohexane-1,4-dicarboxylate, isoundecyl n-hexyl cyclohexane-1,4-dicarboxylate, n-dodecyl n-hexyl cyclohexane-1,4-dicarboxylate, isododecyl n-hexyl cyclohexane-1,4-dicarboxylate, n-tridecyl n-hexyl cyclohexane-1,4-dicarboxylate, isotridecyl n-hexyl cyclohexane-1,4-dicarboxylate, n-heptyl isohexyl cyclohexane-1,4-dicarboxylate, isoheptyl isohexyl cyclohexane-1,4-dicarboxylate, n-octyl isohexyl cyclohexane-1,4-dicarboxylate, isooctyl isohexyl cyclohexane-1,4-dicarboxylate, 2-ethylhexyl isohexyl cyclohexane-1,4-dicarboxylate, n-nonyl isohexyl cyclohexane-1,4-dicarboxylate, isononyl isohexyl cyclohexane-1,4-dicarboxylate, 2-propylheptyl isohexyl cyclohexane-1,4-dicarboxylate, n-decyl isohexyl cyclohexane-1,4-dicarboxylate, isodecyl isohexyl cyclohexane-1,4-dicarboxylate, n-undecyl isohexyl cyclohexane-1,4-dicarboxylate, isoundecyl isohexyl cyclohexane-1,4- dicarboxylate, n-dodecyl isohexyl cyclohexane-1,4-dicarboxylate, isododecyl isohexyl cyclohexane-1,4-dicarboxylate, n-tridecyl isohexyl cyclohexane-1,4-dicarboxylate, isotridecyl isohexyl cyclohexane-1,4-dicarboxylate, isoheptyl n-heptyl cyclohexane-1,4-dicarboxylate, n-octyl n-heptyl cyclohexane-1,4-dicarboxylate, isooctyl n-heptyl cyclohexane-1,4-dicarboxylate, 2-ethylhexyl n-heptyl cyclohexane-1,4-dicarboxylate, n-nonyl n-heptyl cyclohexane-1,4-dicarboxylate, isononyl n-heptyl cyclohexane-1,4-dicarboxylate, 2-propylheptyl n-heptyl cyclohexane-1,4-dicarboxylate, n-decyl n-heptyl cyclohexane-1,4-dicarboxylate, isodecyl n-heptyl cyclohexane-1,4-dicarboxylate, n-undecyl n-heptyl cyclohexane-1,4-dicarboxylate, isoundecyl n-heptyl cyclohexane-1,4-dicarboxylate, n-dodecyl n-heptyl cyclohexane-1,4-dicarboxylate, isododecyl n-heptyl cyclohexane-1,4-dicarboxylate, n-tridecyl n-heptyl cyclohexane-1,4-dicarboxylate, isotridecyl n-heptyl cyclohexane-1,4-dicarboxylate, n-octyl isoheptyl cyclohexane-1,4-dicarboxylate, isooctyl isoheptyl cyclohexane-1,4-dicarboxylate, 2-ethylhexyl isoheptyl cyclohexane-1,4-dicarboxylate, n-nonyl isoheptyl cyclohexane-1,4-dicarboxylate, isononyl isoheptyl cyclohexane-1,4-dicarboxylate, 2-propylheptyl isoheptyl cyclohexane-1,4-dicarboxylate, n-decyl isoheptyl cyclohexane-1,4-dicarboxylate, isodecyl isoheptyl cyclohexane-1,4-dicarboxylate, n-undecyl isoheptyl cyclohexane-1,4-dicarboxylate, isoundecyl isoheptyl cyclohexane-1,4-dicarboxylate, n-dodecyl isoheptyl cyclohexane-1,4-dicarboxylate, isododecyl isoheptyl cyclohexane-1,4-dicarboxylate, n-tridecyl isoheptyl cyclohexane-1,4-dicarboxylate, isotridecyl isoheptyl cyclohexane-1,4-dicarboxylate, isooctyl n-octyl cyclohexane-1,4-dicarboxylate, 2-ethylhexyl n-octyl cyclohexane-1,4-dicarboxylate, n-nonyl n-octyl cyclohexane-1,4-dicarboxylate, isononyl n-octyl cyclohexane-1,4-dicarboxylate, 2-propylheptyl n-octyl cyclohexane-1,4-dicarboxylate, n-decyl n-octyl cyclohexane-1,4-dicarboxylate, isodecyl n-octyl cyclohexane-1,4-dicarboxylate, n-undecyl n-octyl cyclohexane-1,4-dicarboxylate, isoundecyl n-octyl cyclohexane-1,4-dicarboxylate, n-dodecyl n-octyl cyclohexane-1,4-dicarboxylate, isododecyl n-octyl cyclohexane-1,4-dicarboxylate, n-tridecyl n-octyl cyclohexane-1,4-dicarboxylate, isotridecyl n-octyl cyclohexane-1,4-dicarboxylate, 2-ethylhexyl isooctyl cyclohexane-1,4-dicarboxylate, n-nonyl isooctyl cyclohexane-1,4-dicarboxylate, isononyl isooctyl cyclohexane-1,4-dicarboxylate, 2-propylheptyl isooctyl cyclohexane-1,4-dicarboxylate, n-decyl isooctyl cyclohexane-1,4-dicarboxylate, isodecyl isooctyl cyclohexane-1,4-dicarboxylate, n-undecyl isooctyl cyclohexane-1,4-dicarboxylate, isoundecyl isooctyl cyclohexane-1,4-dicarboxylate, n-dodecyl isooctyl cyclohexane-1,4-dicarboxylate, isododecyl isooctyl cyclohexane-1,4-dicarboxylate, n-tridecyl isooctyl cyclohexane-1,4-dicarboxylate, isotridecyl isooctyl cyclohexane-1,4-dicarboxylate, n-nonyl 2-ethylhexyl cyclohexane-1,4-dicarboxylate, isononyl 2-ethylhexyl cyclohexane-1,4-dicarboxylate, 2-propylheptyl 2-ethylhexyl cyclohexane-1,4-dicarboxylate, n-decyl 2-ethylhexyl cyclohexane-1,4-dicarboxylate, isodecyl 2-ethylhexyl cyclohexane-1,4-dicarboxylate, n-undecyl 2-ethylhexyl cyclohexane-1,4-dicarboxylate, isoundecyl 2-ethylhexyl cyclohexane-1,4-dicarboxylate, n-dodecyl 2-ethylhexyl cyclohexane-1,4-dicarboxylate, isododecyl 2-ethylhexyl cyclohexane-1,4-dicarboxylate, n-tridecyl 2-ethylhexyl cyclohexane-1,4-dicarboxylate, isotridecyl 2-ethylhexyl cyclohexane-1,4-dicarboxylate, isononyl n-nonyl cyclohexane-1,4-dicarboxylate, 2-propylheptyl n-nonyl cyclohexane-1,4-dicarboxylate, n-decyl n-nonyl cyclohexane-1,4-dicarboxylate, isodecyl n-nonyl cyclohexane-1,4-dicarboxylate, n-undecyl n-nonyl cyclohexane-1,4-dicarboxylate, isoundecyl n-nonyl cyclohexane-1,4-dicarboxylate, n-dodecyl n-nonyl cyclohexane-1,4-dicarboxylate, isododecyl n-nonyl cyclohexane-1,4-dicarboxylate, n-tridecyl n-nonyl cyclohexane-1,4-dicarboxylate, isotridecyl n-nonyl cyclohexane-1,4-dicarboxylate, 2-propylheptyl isononyl cyclohexane-1,4-dicarboxylate, n-decyl isononyl cyclohexane-1,4-dicarboxylate, isodecyl isononyl cyclohexane-1,4-dicarboxylate, n-undecyl isononyl cyclohexane-1,4-dicarboxylate, isoundecyl isononyl cyclohexane-1,4-dicarboxylate, n-dodecyl isononyl cyclohexane-1,4-dicarboxylate, isododecyl isononyl cyclohexane-1,4-dicarboxylate, n-tridecyl isononyl cyclohexane-1,4-dicarboxylate, isotridecyl isononyl cyclohexane-1,4-dicarboxylate, n-decyl 2-propylheptyl cyclohexane-1,4-dicarboxylate, isodecyl 2-propylheptyl cyclohexane-1,4-dicarboxylate, n-undecyl 2-propylheptyl cyclohexane-1,4-dicarboxylate, isoundecyl 2-propylheptyl cyclohexane-1,4-dicarboxylate, n-dodecyl 2-propylheptyl cyclohexane-1,4-dicarboxylate, isododecyl 2-propylheptyl cyclohexane-1,4-dicarboxylate, n-tridecyl 2-propylheptyl cyclohexane-1,4-dicarboxylate, isotridecyl 2-propylheptyl cyclohexane-1,4-dicarboxylate, isodecyl n-decyl cyclohexane-1,4-dicarboxylate, n-undecyl n-decyl cyclohexane-1,4-dicarboxylate, isoundecyl n-decyl cyclohexane-1,4-dicarboxylate, n-dodecyl n-decyl cyclohexane-1,4-dicarboxylate, isododecyl n-decyl cyclohexane-1,4-dicarboxylate, n-tridecyl n-decyl cyclohexane-1,4-dicarboxylate, isotridecyl n-decyl cyclohexane-1,4-dicarboxylate, n-undecyl isodecyl cyclohexane-1,4-dicarboxylate, isoundecyl isodecyl cyclohexane-1,4-dicarboxylate, n-dodecyl isodecyl cyclohexane-1,4-dicarboxylate, isododecyl isodecyl cyclohexane-1,4-dicarboxylate, n-tridecyl isodecyl cyclohexane-1,4-dicarboxylate, isotridecyl isodecyl cyclohexane-1,4-dicarboxylate, isoundecyl n-undecyl cyclohexane-1,4-dicarboxylate, n-dodecyl n-undecyl cyclohexane-1,4-dicarboxylate, isododecyl n-undecyl cyclohexane-1,4-dicarboxylate, n-tridecyl n-undecyl cyclohexane-1,4-dicarboxylate, isotridecyl n-undecyl cyclohexane-1,4-dicarboxylate, n-dodecyl isoundecyl cyclohexane-1,4-dicarboxylate, isododecyl isoundecyl cyclohexane-1,4-dicarboxylate, n-tridecyl isoundecyl cyclohexane-1,4-dicarboxylate, isotridecyl isoundecyl cyclohexane-1,4-dicarboxylate, isododecyl n-dodecyl cyclohexane-1,4-dicarboxylate, n-tridecyl n-dodecyl cyclohexane-1,4-dicarboxylate, isotridecyl n-dodecyl cyclohexane-1,4-dicarboxylate, n-tridecyl isododecyl cyclohexane-1,4-dicarboxylate, isotridecyl isododecyl cyclohexane-1,4-dicarboxylate, isotridecyl n-tridecyl cyclohexane-1,4-dicarboxylate, methyl cyclohexyl cyclohexane-1,4-dicarboxylate, ethyl cyclohexyl cyclohexane-1,4-dicarboxylate, n-propyl cyclohexyl cyclohexane-1,4-dicarboxylate, isopropyl cyclohexyl cyclohexane-1,4-dicarboxylate, n-butyl cyclohexyl cyclohexane-1,4-dicarboxylate, tert-butyl cyclohexyl cyclohexane-1,4-dicarboxylate, isobutyl cyclohexyl cyclohexane-1,4-dicarboxylate, glycol cyclohexyl cyclohexane-1,4-dicarboxylate, n-hexyl cyclohexyl cyclohexane-1,4-dicarboxylate, isohexyl cyclohexyl cyclohexane-1,4-dicarboxylate, n-heptyl cyclohexyl cyclohexane-1,4- dicarboxylate, isoheptyl cyclohexyl cyclohexane-1,4-dicarboxylate, n-octyl cyclohexyl cyclohexane-1,4-dicarboxylate, isooctyl cyclohexyl cyclohexane-1,4-dicarboxylate, 2-ethylhexyl cyclohexyl cyclohexane-1,4-dicarboxylate, n-nonyl cyclohexyl cyclohexane-1,4-dicarboxylate, isononyl cyclohexyl cyclohexane-1,4-dicarboxylate, 2-propylheptyl cyclohexyl cyclohexane-1,4-dicarboxylate, n-decyl cyclohexyl cyclohexane-1,4-dicarboxylate, isodecyl cyclohexyl cyclohexane-1,4-dicarboxylate, n-undecyl cyclohexyl cyclohexane-1,4-dicarboxylate, isoundecyl cyclohexyl cyclohexane-1,4-dicarboxylate, n-dodecyl cyclohexyl cyclohexane-1,4-dicarboxylate, isododecyl cyclohexyl cyclohexane-1,4-dicarboxylate, n-tridecyl cyclohexyl cyclohexane-1,4-dicarboxylate, isotridecyl cyclohexyl cyclohexane-1,4-dicarboxylate, methyl isopentyl cyclohexane-1,4-dicarboxylate, ethyl isopentyl cyclohexane-1,4-dicarboxylate, n-propyl isopentyl cyclohexane-1,4-dicarboxylate, isopropyl isopentyl cyclohexane-1,4-dicarboxylate, n-butyl isopentyl cyclohexane-1,4-dicarboxylate, tert-butyl isopentyl cyclohexane-1,4-dicarboxylate, isobutyl isopentyl cyclohexane-1,4-dicarboxylate, glycol isopentyl cyclohexane-1,4-dicarboxylate, n-hexyl isopentyl cyclohexane-1,4-dicarboxylate, isohexyl isopentyl cyclohexane-1,4-dicarboxylate, n-heptyl isopentyl cyclohexane-1,4-dicarboxylate, isoheptyl isopentyl cyclohexane-1,4-dicarboxylate, n-octyl isopentyl cyclohexane-1,4-dicarboxylate, isooctyl isopentyl cyclohexane-1,4-dicarboxylate, 2-ethylhexyl isopentyl cyclohexane-1,4-dicarboxylate, n-nonyl isopentyl cyclohexane-1,4-dicarboxylate, isononyl isopentyl cyclohexane-1,4-dicarboxylate, 2-propylheptyl isopentyl cyclohexane-1,4-dicarboxylate, n-decyl isopentyl cyclohexane-1,4-dicarboxylate, isodecyl isopentyl cyclohexane-1,4-dicarboxylate, n-undecyl isopentyl cyclohexane-1,4-dicarboxylate, isoundecyl isopentyl cyclohexane-1,4-dicarboxylate, n-dodecyl isopentyl cyclohexane-1,4-dicarboxylate, isododecyl isopentyl cyclohexane-1,4-dicarboxylate, n-tridecyl isopentyl cyclohexane-1,4-dicarboxylate, isotridecyl isopentyl cyclohexane-1,4-dicarboxylate, methyl n-pentyl cyclohexane-1,4-dicarboxylate, ethyl n-pentyl cyclohexane-1,4-dicarboxylate, n-propyl n-pentyl cyclohexane-1,4-dicarboxylate, isopropyl n-pentyl cyclohexane-1,4-dicarboxylate, n-butyl n-pentyl cyclohexane-1,4-dicarboxylate, tert-butyl n-pentyl cyclohexane-1,4-dicarboxylate, isobutyl n-pentyl cyclohexane-1,4-dicarboxylate, glycol n-pentyl cyclohexane-1,4-dicarboxylate, n-hexyl n-pentyl cyclohexane-1,4-dicarboxylate, isohexyl n-pentyl cyclohexane-1,4-dicarboxylate, n-heptyl n-pentyl cyclohexane-1,4-dicarboxylate, isoheptyl n-pentyl cyclohexane-1,4-dicarboxylate, n-octyl n-pentyl cyclohexane-1,4-dicarboxylate, isooctyl n-pentyl cyclohexane-1,4-dicarboxylate, 2-ethylhexyl n-pentyl cyclohexane-1,4-dicarboxylate, n-nonyl n-pentyl cyclohexane-1,4-dicarboxylate, isononyl n-pentyl cyclohexane-1,4-dicarboxylate, 2-propylheptyl n-pentyl cyclohexane-1,4-dicarboxylate, n-decyl n-pentyl cyclohexane-1,4-dicarboxylate, isodecyl n-pentyl cyclohexane-1,4-dicarboxylate, n-undecyl n-pentyl cyclohexane-1,4-dicarboxylate, isoundecyl n-pentyl cyclohexane-1,4-dicarboxylate, n-dodecyl n-pentyl cyclohexane-1,4-dicarboxylate, isododecyl n-pentyl cyclohexane-1,4-dicarboxylate, n-tridecyl n-pentyl cyclohexane-1,4-dicarboxylate, isotridecyl n-pentyl cyclohexane-1,4-dicarboxylate;

alkyl cyclohexane-1,3-dicarboxylates, such as, for example, monomethyl cyclohexane-1,3-dicarboxylate, dimethyl cyclohexane-1,3-dicarboxylate, diethyl cyclohexane-1,3-dicarboxylate, di-n-propyl cyclohexane-1,3-dicarboxylate, di-n-butyl cyclohexane-1,3-dicarboxylate, di-tert-butyl cyclohexane-1,3-dicarboxylate, diisobutyl cyclohexane-1,3-dicarboxylate, monoglycol cyclohexane-1,3-dicarboxylate, diglycol cyclohexane-1,3-dicarboxylate, di-n-octyl cyclohexane-1,3-dicarboxylate, diisooctyl cyclohexane-1,3-dicarboxylate, di-2-ethylhexyl cyclohexane-1,3-dicarboxylate, di-n-nonyl cyclohexane-1,3-dicarboxylate, diisononyl cyclohexane-1,3-dicarboxylate, di-n-decyl cyclohexane-1,3-dicarboxylate, diisodecyl cyclohexane-1,3-dicarboxylate, di-n-undecyl cyclohexane-1,3-dicarboxylate, diisododecyl cyclohexane-1,3-dicarboxylate, di-n-octadecyl cyclohexane-1,3-dicarboxylate, diisooctadecyl cyclohexane-1,3-dicarboxylate, di-n-eicosyl cyclohexane-1,3-dicarboxylate, monocyclohexyl cyclohexane-1,3-dicarboxylate, dicyclohexyl cyclohexane-1,3-dicarboxylate;

diisopropyl cyclohexane-1,3-dicarboxylate, di-n-hexyl cyclohexane-1,3-dicarboxylate, diisohexyl cyclohexane-1,3-dicarboxylate, di-n-heptyl cyclohexane-1,3-dicarboxylate, diisoheptyl cyclohexane-1,3-dicarboxylate, di-2-propylheptyl cyclohexane-1,3-dicarboxylate, diisoundecyl cyclohexane-1,3-dicarboxylate, di-n-dodecyl cyclohexane-1,3-dicarboxylate, di-n-tridecyl cyclohexane-1,2-dicarboxylate, diisotridecyl cyclohexane-1,3-dicarboxylate, di-n-pentyl cyclohexane-1,3-dicarboxylate, diisopentyl cyclohexane-1,3-dicarboxylate;

alkyl cyclohexane-1,2,4-tricarboxylates, such as, for example, monomethyl cyclohexane-1,2,4-tricarboxylate, dimethyl cyclohexane-1,2,4-tricarboxylate, diethyl cyclohexane-1,2,4-tricarboxylate, di-n-propyl cyclohexane-1,2,4-tricarboxylate, diisopropyl cyclohexane-1,2,4-tricarboxylate, di-n-butyl cyclohexane-1,2,4-tricarboxylate, di-tert-butyl cyclohexane-1,2,4-tricarboxylate, diisobutyl cyclohexane-1,2,4-tricarboxylate, monoglycol cyclohexane-1,2,4-tricarboxylate, diglycol cyclohexane-1,2,4-tricarboxylate, di-n-octyl cyclohexane-1,2,4-tricarboxylate, diisooctyl cyclohexane-1,2,4-tricarboxylate, di-2-ethylhexyl cyclohexane-1,2,4-tricarboxylate, di-n-nonyl cyclohexane-1,2,4-tricarboxylate, diisononyl cyclohexane-1,2,4-tricarboxylate, di-n-decyl cyclohexane-1,2,4-tricarboxylate, diisodecyl cyclohexane-1,2,4-tricarboxylate, di-n-undecyl cyclohexane-1,2,4-tricarboxylate, diisododecyl cyclohexane-1,2,4-tricarboxylate, di-n-octadecyl cyclohexane-1,2,4-tricarboxylate, diisooctadecyl cyclohexane-1,2,4-tricarboxylate, di-n-eicosyl cyclohexane-1,2,4-tricarboxylate, monocyclohexyl cyclohexane-1,2,4-tricarboxylate, dicyclohexyl cyclohexane-1,2,4-tricarboxylate and trimethyl cyclohexane-1,2,4-tricarboxylate, triethyl cyclohexane-1,2,4-tricarboxylate, tri-n-propyl cyclohexane-1,2,4-tricarboxylate, tri-n-butyl cyclohexane-1,2,4-tricarboxylate, tri-tert-butyl cyclohexane-1,2,4-tricarboxylate, triisobutyl cyclohexane-1,2,4-tricarboxylate, triglycol cyclohexane-1,2,4-tricarboxylate, tri-n-octyl cyclohexane-1,2,4-tricarboxylate, triisooctyl cyclohexane-1,2,4-tricarboxylate, tri-2-ethyl hexyl cyclohexane-1,2,4-tricarboxylate, tri-n-nonyl cyclohexane-1,2,4-tricarboxylate, triisononyl cyclohexane-1,2,4-tricarboxylate, tri-n-decyl cyclohexane-1,2,4-tricarboxylate, triisododecyl cyclohexane-1,2,4-tricarboxylate, tri-n-undecyl cyclohexane-1,2,4-tricarboxylate, triisododecyl cyclohexane-1,2,4-tricarboxylate, tri-n-octadecyl cyclohexane-1,2,4-tricarboxylate, triisooctadecyl cyclohexane-1,2,4-tricarboxylate, tri-n-eicosyl cyclohexane-1,2,4-tricarboxylate, tricyclohexyl cyclohexane-1,2,4-tricarboxylate, di-n-hexyl cyclohexane-1,2,4-tricarboxylate, diisohexyl cyclohexane-1,2,4-tricarboxylate, tri-n-hexyl cyclohexane-1,2,4-tricarboxylate, triisohexyl cyclohexane-1,2,4-tricarboxylate, di-n-heptyl cyclohexane-1,2,4-tricarboxylate, diisoheptyl cyclohexane-1,2,4-tricarboxylate, tri-n-heptyl cyclohexane-1,2,4-tricarboxylate, triisoheptyl cyclohexane-1,2,4-tricarboxylate, di-n-pentyl cyclohexane-1,2,4-tricarboxylate, diisopentyl cyclohexane-1,2,4-tricarboxylate, tri-n-pentyl cyclohexane-1,2,4-tricarboxylate, triisopentyl cyclohexane-1,2,4-tricarboxylate, di-n-tridecyl cyclohexane-1,2,4-tricarboxylate, diisotridecyl cyclohexane-1,2,4-tricarboxylate, tri-n-tridecyl cyclohexane-1,2,4-tricarboxylate, triisotridecyl cyclohexane-1,2,4-tricarboxylate, di-n-dodecyl cyclohexane-1,2,4-tricarboxylate, diisoundecyl cyclohexane-1,2,4-tricarboxylate, tri-n-dodecyl cyclohexane-1,2,4-tricarboxylate, triisoundecyl cyclohexane-1,2,4-tricarboxylate, triisopropyl cyclohexane-1,2,4-tricarboxylate;

alkyl cyclohexane-1,3,5-tricarboxylates, such as, for example, monomethyl cyclohexane-1,3,5-tricarboxylate, dimethyl cyclohexane-1,3,5-tricarboxylate, diethyl cyclohexane-1,3,5-tricarboxylate, di-n-propyl cyclohexane-1,3,5-tricarboxylate, di-n-butyl cyclohexane-1,3,5-tricarboxylate, di-tert-butyl cyclohexane-1,3,5-tricarboxylate, diisobutyl cyclohexane-1,3,5-tricarboxylate, monoglycol cyclohexane-1,3,5-tricarboxylate, diglycol cyclohexane-1,3,5-tricarboxylate, di-n-octyl cyclohexane-1,3,5-tricarboxylate, diisooctyl cyclohexane-1,3,5-tricarboxylate, di-2-ethylhexyl cyclohexane-1,3,5-tricarboxylate, di-n-nonyl cyclohexane-1,3,5-tricarboxylate, diisononyl cyclohexane-1,3,5-tricarboxylate, di-n-decyl cyclohexane-1,3,5-tricarboxylate, diisodecyl cyclohexane-1,3,5-tricarboxylate, di-n-undecyl cyclohexane-1,3,5-tricarboxylate, diisododecyl cyclohexane-1,3,5-tricarboxylate, di-n-octadecyl cyclohexane-1,3,5-tricarboxylate, diisooctadecyl cyclohexane-1,3,5-tricarboxylate, di-n-eicosyl cyclohexane-1,3,5-tricarboxylate, monocyclohexyl cyclohexane-1,3,5-tricarboxylate, dicyclohexyl cyclohexane-1,3,5-tricarboxylate, and trimethyl cyclohexane-1,3,5-tricarboxylate, triethyl cyclohexane-1,3,5-tricarboxylate, tri-n-propyl cyclohexane-1,3,5-tricarboxylate, tri-n-butyl cyclohexane-1,3,5-tricarboxylate, tri-tert-butyl cyclohexane-1,3,5-tricarboxylate, triisobutyl cyclohexane-1,3,5-tricarboxylate, triglycol cyclohexane-1,3,5-tricarboxylate, tri-n-octyl cyclohexane-1,3,5-tricarboxylate, triisooctyl cyclohexane-1,3,5-tricarboxylate, tri-2-ethylhexyl cyclohexane-1,3,5-tricarboxylate, tri-n-nonyl cyclohexane-1,3,5-tricarboxylate, triisononyl cyclohexane-1,3,5-tricarboxylate, tri-n-decyl cyclohexane-1,3,5-tricarboxylate, triisododecyl cyclohexane-1,3,5-tricarboxylate, tri-n-undecyl cyclohexane-1,3,5-tricarboxylate, triisododecyl cyclohexane-1,3,5-tricarboxylate, tri-n-octadecyl cyclohexane-1,3,5-tricarboxylate, triisooctadecyl cyclohexane-1,3,5-tricarboxylate, tri-n-eicosyl cyclohexane-1,3,5-tricarboxylate, tricyclohexyl cyclohexane-1,3,5-tricarboxylate, di-n-hexyl cyclohexane-1,3,5-tricarboxylate, diisohexyl cyclohexane-1,3,5-tricarboxylate, tri-n-hexyl cyclohexane-1,3,5-tricarboxylate, triisohexyl cyclohexane-1,3,5-tricarboxylate, di-n-heptyl cyclohexane-1,3,5-tricarboxylate, diisoheptyl cyclohexane-1,3,5-tricarboxylate, tri-n-heptyl cyclohexane-1,3,5-tricarboxylate, triisoheptyl cyclohexane-1,3,5-tricarboxylate, di-n-pentyl cyclohexane-1,3,5-tricarboxylate, diisopentyl cyclohexane-1,3,5-tricarboxylate, tri-n-pentyl cyclohexane-1,3,5-tricarboxylate, triisopentyl cyclohexane-1,3,5-tricarboxylate, di-n-tridecyl cyclohexane-1,3,5-tricarboxylate, diisotridecyl cyclohexane-1,3,5-tricarboxylate, tri-n-tridecyl cyclohexane-1,3,5-tricarboxylate, triisotridecyl cyclohexane-1,3,5-tricarboxylate, di-n-dodecyl cyclohexane-1,3,5-tricarboxylate, diisoundecyl cyclohexane-1,3,5-tricarboxylate, tri-n-dodecyl cyclohexane-1,3,5-tricarboxylate, triisoundecyl cyclohexane-1,3,5-tricarboxylate, triisopropyl cyclohexane-1,3,5-tricarboxylate;

alkyl cyclohexane-1,2,3-tricarboxylates, such as, for example, monomethyl cyclohexane-1,2,3-tricarboxylate, dimethyl cyclohexane-1,2,3-tricarboxylate, diethyl cyclohexane-1,2,3-tricarboxylate, di-n-propyl cyclohexane-1,2,3-tricarboxylate, di-n-butyl cyclohexane-1,2,3-tricarboxylate, di-tert-butyl cyclohexane-1,2,3-tricarboxylate, diisobutyl cyclohexane-1,2,3-tricarboxylate, monoglycol cyclohexane-1,2,3-tricarboxylate, diglycol cyclohexane-1,2,3-tricarboxylate, di-n-octyl cyclohexane-1,2,3-tricarboxylate, diisooctyl cyclohexane-1,2,3-tricarboxylate, di-2-ethylhexyl cyclohexane-1,2,3-tricarboxylate, di-n-nonyl cyclohexane-1,2,3-tricarboxylate, diisononyl cyclohexane-1,2,3-tricarboxylate, di-n-decyl cyclohexane-1,2,3-tricarboxylate, diisodecyl cyclohexane-1,2,3-tricarboxylate, di-n-undecyl cyclohexane-1,2,3-tricarboxylate, diisododecyl cyclohexane-1,2,3-tricarboxylate, di-n-octadecyl cyclohexane-1,2,3-tricarboxylate, diisooctadecyl cyclohexane-1,2,3-tricarboxylate, di-n-eicosyl cyclohexane-1,2,3-tricarboxylate, monocyclohexyl cyclohexane-1,2,3-tricarboxylate, dicyclohexyl cyclohexane-1,2,3-tricarboxylate, and trimethyl cyclohexane-1,2,3-tricarboxylate, triethyl cyclohexane-1,2,3-tricarboxylate, tri-n-propyl cyclohexane-1,2,3-tricarboxylate, tri-n-butyl cyclohexane-1,2,3-tricarboxylate, tri-tert-butyl cyclohexane-1,2,3-tricarboxylate, triisobutyl cyclohexane-1,2,3-tricarboxylate, triglycol cyclohexane-1,2,3-tricarboxylate, tri-n-octyl cyclohexane-1,2,3-tricarboxylate, triisooctyl cyclohexane-1,2,3-tricarboxylate, tri-2-ethylhexyl cyclohexane-1,2,3-tricarboxylate, tri-n-nonyl cyclohexane-1,2,3-tricarboxylate, triisononyl cyclohexane-1,2,3-tricarboxylate, tri-n-decyl cyclohexane-1,2,3-tricarboxylate, triisododecyl cyclohexane-1,2,3-tricarboxylate, tri-n-undecyl cyclohexane-1,2,3-tricarboxylate, triisododecyl cyclohexane-1,2,3-tricarboxylate, tri-n-octadecyl cyclohexane-1,2,3-tricarboxylate, triisooctadecyl cyclohexane-1,2,3-tricarboxylate, tri-n-eicosyl cyclohexane-1,2,3-tricarboxylate, tricyclohexyl cyclohexane-1,2,3-tricarboxylate, di-n-hexyl cyclohexane-1,2,3-tricarboxylate, diisohexyl cyclohexane-1,2,3-tricarboxylate, tri-n-hexyl cyclohexane-1,2,3-tricarboxylate, triisohexyl cyclohexane-1,2,3-tricarboxylate, di-n-heptyl cyclohexane-1,2,3-tricarboxylate, diisoheptyl cyclohexane-1,2,3-tricarboxylate, tri-n-heptyl cyclohexane-1,2,3-tricarboxylate, triisoheptyl cyclohexane-1,2,3-tricarboxylate, di-n-pentyl cyclohexane-1,2,3-tricarboxylate, diisopentyl cyclohexane-1,2,3-tricarboxylate, tri-n-pentyl cyclohexane-1,2,3-tricarboxylate, triisopentyl cyclohexane-1,2,3-tricarboxylate, di-n-tridecyl cyclohexane-1,2,3-tricarboxylate, diisotridecyl cyclohexane-1,2,3-tricarboxylate, tri-n-tridecyl cyclohexane-1,2,3-tricarboxylate, triisotridecyl cyclohexane-1,2,3-tricarboxylate, di-n-dodecyl cyclohexane-1,2,3-tricarboxylate, diisoundecyl cyclohexane-1,2,3-tricarboxylate, tri-n-dodecyl cyclohexane-1,2,3-tricarboxylate, triisoundecyl cyclohexane-1,2,3-tricarboxylate, triisopropyl cyclohexane-1,2,3-tricarboxylate;

alkyl cyclohexane-1,2,4,5-tetracarboxylates such as, for example, monomethyl cyclohexane-1,2,4,5-tetracarboxylate, dimethyl cyclohexane-1,2,4,5-tetracarboxylate, diethyl cyclohexane-1,2,4,5-tetracarboxylate, di-n-propyl cyclohexane-1,2,4,5-tetracarboxylate, di-n-butyl cyclohexane-1,2,4,5-tetracarboxylate, di-tert-butyl cyclohexane-1,2,4,5-tetracarboxylate, diisobutyl cyclohexane-1,2,4,5-tetracarboxylate, monoglycol cyclohexane-1,2,4,5-tetracarboxylate, diglycol cyclohexane-1,2,4,5- tetracarboxylate, di-n-octyl cyclohexane-1,2,4,5-tetracarboxylate, tri-n-tridecyl cyclohexane-1,2,4,5-tetracarboxylate, triisotridecyl cyclohexane-1,2,4,5-tetracarboxylate, di-n-dodecyl cyclohexane-1,2,4,5-tetracarboxylate, diisododecyl cyclohexane-1,2,4,5-tetracarboxylate, tri-n-dodecyl cyclohexane-1,2,4,5-tetracarboxylate, triisoundecyl cyclohexane-1,2,4,5-tetracarboxylate, triisopropyl cyclohexane-1,2,4,5-tetracarboxylate, tetra-n-hexyl cyclohexane-1,2,4,5-tetracarboxylate, tetraisohexyl cyclohexane-1,2,4,5-tetracarboxylate, tetra-n-heptyl cyclohexane-1,2,4,5-tetracarboxylate, tetraisoheptyl cyclohexane-1,2,4,5-tetracarboxylate, tetra-n-pentyl cyclohexane-1,2,4,5-tetracarboxylate, tetraisopentyl cyclohexane-1,2,4,5-tetracarboxylate, tetra-n-tridecyl cyclohexane-1,2,4,5-tetracarboxylate, tetraisotridecyl cyclohexane-1,2,4,5-tetracarboxylate, tetra-n-dodecyl cyclohexane-1,2,4,5-tetracarboxylate, tetraisoundecyl cyclohexane-1,2,4,5-tetracarboxylate, tetraisopropyl cyclohexane-1,2,4,5-tetracarboxylate;

anhydrides of cyclohexane-1,2-dicarboxylic acid, cyclohexane-1,2,4-tricarboxylic acid, cyclohexane-1,2,3-tricarboxylic acid and cyclohexane-1,2,4,5-tetracarboxylic acid.

In the context of the present invention, the cyclohexane-1,2-dicarboxylates disclosed in WO 99/32427 and listed again below are also suitable:

mixed esters of cyclohexane-1,2-dicarboxylic acid with $C_1$- to $C_{13}$-alcohols; diisopentyl cyclohexane-1,2-dicarboxylate, obtainable by hydrogenation of diisopentyl phthalate having the Chemical Abstracts Registry Number (below: CAS No.) 84777-06-0;

diisoheptyl cyclohexane-1,2-dicarboxylate, obtainable by hydrogenation of diisoheptyl phthalate having the CAS No. 71888-89-6;

diisononyl cyclohexane-1,2-dicarboxylate, obtainable by hydrogenation of a diisononyl phthalate having the CAS No. 68515-48-0;

diisononyl cyclohexane-1,2-dicarboxylate, obtainable by hydrogenation of a diisononyl phthalate having the CAS No. 28553-12-0, based n-butene;

diisononyl cyclohexane-1,2-dicarboxylate, obtainable by hydrogenation of a diisononyl phthalate having the CAS No. 28553-12-0, based on isobutene;

a 1,2-di-$C_9$-ester of cyclohexanedicarboxylic acid, obtainable by hydrogenation of a dinonyl phthalate having the CAS No. 68515-46-8;

a diisodecyl cyclohexane-1,2-dicarboxylate, obtainable by hydrogenation of a diisodecyl phthalate having the CAS No. 68515-49-1;

a 1,2-di-$C_{7-11}$-ester of cyclohexanedicarboxylic acid, obtainable by hydrogenation of the corresponding phthalic ester having the CAS No. 68515-42-4;

a 1,2-di-$C_{7-11}$-ester of cyclohexanedicarboxylic acid, obtainable by hydrogenation of the di-$C_{7-11}$-phthalates having the following CAS No.
111 381-89-6,
111 381 90-9,
111 381 91-0,
68515-44-6,
68515-45-7 and
3648-20-2;

a 1,2-di-$C_{9-11}$-ester of cyclohexanedicarboxylic acid, obtainable by hydrogenation of a di-$C_{9-11}$-phthalate having the CAS No. 98515-43-6;

a 1,2-diisodecyl cyclohexanedicarboxylate, obtainable by hydrogenation of a diisodecyl phthalate, which mainly comprises di-2-propylheptyl phthalate;

a 1,2-di-$C_{7-9}$-cyclohexanedicarboxylate, obtainable by hydrogenation of the corresponding phthalate which has branched or linear $C_{7-9}$-alkyl ester groups; corresponding phthalates which can be used, for example, as starting materials have the following CAS No.:

di-$C_{7,9}$-alkyl phthalate having the CAS No. 111 381-89-6;
di-$C_7$-alkyl phthalate having the CAS No. 68515-44-6; and
di-$C_9$-alkyl phthalate having the CAS No. 68515-45-7.

The content of WO 99/32427, which relates, inter alia, to these compounds listed above and to the preparation of cyclohexanepolycarboxylic acids using special catalysts having macropores, is hereby incorporated by reference in its entirety in the present application.

According to the invention, hydrogenation products of mixed esters of phthalic acid with $C_{10}$- and $C_{13}$-alcohols can also be used, as described in DE-A 100 32 580.7.

Furthermore, the hydrogenation products of the commercially available benzenecarboxylates with the tradenames Jayflex DINP (CAS No. 68515-48-0), Jayflex DIDP (CAS No. 68515-49-1), Palatinol 9-P, Vestinol 9 (CAS No. 28553-12-0), TOTM-I (CAS No. 3319-31-1), Linplast 68-TM, Palatinol N (CAS No. 28553-12-0), Jayflex DHP (CAS No. 68515-50-4), Jayflex DIOP (CAS No. 27554-26-3), Jayflex UDP (CAS No. 68515-47-9), Jayflex DIUP (CAS No. 85507-79-5), Jayflex DTDP (CAS No. 68515-47-9), Jayflex L9P (CAS No. 68515-45-7), Jayflex L911P (CAS No. 68515-43-5), Jayflex L11P (CAS No. 3648-20-2), Witamol 110 (CAS No. 90193-91-2), Witamol 118 (di-n-$C_8$-$C_{10}$-alkylphthalate), Unimoll BB (CAS No. 85-68-7), Linplast 1012 BP (CAS No. 90193-92-3), Linplast 13 XP (CAS No. 27253-26-5), Linplast 610 P (CAS No. 68515-51-5), Linplast 68 FP (CAS No. 68648-93-1) and Linplast 812 HP (CAS No. 70693-30-0), Palatinol AH (CAS No. 117-81-7), Palatinol 711 (CAS No. 68515-42-4), Palatinol 911 (CAS No. 68515-43-5), Palatinol 11 (CAS No. 3648-20-2), Palatinol Z (CAS No. 26761-40-0) and Palatinol DIPP (CAS No. 84777-06-0) are also to be considered as being suitable in the context of the present invention.

Particularly preferred low-dust construction chemistry products comprise dialkyl esters of 1,2-cyclohexanedicarboxylic acid. Straight-chain or branched alkyl groups having 1 to 13 C atoms or mixtures of said alkyl groups are preferred as ester group R. Straight-chain or branched alkyl groups having 8 to 10 C atoms or mixtures of said alkyl groups are particularly preferred as ester group R. Alkyl groups having 9 C atoms are very particularly preferred as ester group R.

The mixtures according to the invention, containing at least one polyol and at least one cyclohexanepolycarboxylic acid derivative, are distinguished from the compounds known from the prior art for dedusting pulverulent construction chemistry products by comparable or better performance characteristics. Thus, when mixed in, they form no agglomerates and are rapidly distributed over the surface of the ingredients of pulverulent construction chemistry products. Their flash points are sufficiently high to satisfy stringent safety standards in preparation and use.

Furthermore, the additives according to the invention are distinguished by a low viscosity and high effectiveness ("spreading effect"), which enables the users to achieve good dedusting effects even with the use of small amounts (0.5 to 2.0% by weight).

Owing to the existing "spreading effect" and the low viscosity, no agglomeration takes place in the product to be dedusted when the dedusting agent is metered in. It is therefore possible for the formulator of the above products to meter the dedusting agent directly into its existing mixing process without a particular spray apparatus.

The preparation of the cyclohexanepolycarboxylic acid derivatives is preferably effected by the process disclosed in WO 99/32427. This process comprises the hydrogenation of a benzenepolycarboxylic acid or of a derivative thereof or of a mixture of two or more thereof by bringing the benzenepolycarboxylic acid or the derivative thereof or the mixture of two or more thereof into contact with a hydrogen-containing gas in the presence of a catalyst which comprises, as active metal, at least one metal of subgroup VIII of the Periodic Table of the Elements, alone or together with at least one metal of subgroup I or VII of the Periodic Table of the Elements, applied to a support, the support having macropores.

In a preferred embodiment, the support has a mean pore diameter of at least 50 nm and a BET surface area of not more than 30 m$^2$/g, and the amount of active metal is 0.01 to 30% by weight, based on the total weight of the catalyst.

In a further embodiment, the catalyst used is one in which the amount of the active metal is 0.01 to 30% by weight, based on the total weight of the catalyst, and 10 to 50% of the pore volume of the support are formed by macropores having a pore diameter in the range from 50 nm to 10 000 nm and 50 to 90% of the pore volume of the support are formed by mesopores having a pore diameter in the range from 2 to 50 nm, the sum of the fractions of the pore volumes being 100%.

In a further embodiment, the catalyst has 0.01 to 30% by weight, based on the total weight of the catalyst, of an active metal, applied to a support, the support having a mean pore diameter of at least 0.1 μm and a BET surface area of not more than 15 m$^2$/g. Supports used can in principle be all supports which have macropores, i.e. supports which have exclusively macropores, and those which also contain mesopores and/or micropores in addition to macropores.

In principle, all metals of subgroup VIII of the Periodic Table of the Elements can be used as active metal. Platinum, rhodium, palladium, cobalt, nickel or ruthenium or a mixture of two or more thereof is preferably used as active metal, in particular ruthenium being used as active metal. Among the likewise usable metals of subgroup I or VII or of subgroups I and VII of the Periodic Table of the Elements, all of which can in principle also be used, copper and/or rhenium are preferably employed.

In the context of the present application, the terms "macropores" and "mesopores" are used as defined in Pure Appl. Chem., 45, page 79 (1976), namely as pores whose diameter is above 50 nm (macropores) or whose diameter is between 2 nm and 50 nm (mesopores).

The active metal content is in general 0.01 to 30% by weight, preferably 0.01 to 5% by weight, particularly preferably 0.1 to 5% by weight, based in each case on the total weight of the catalyst used.

The term "benzenepolycarboxylic acid or a derivative thereof" which is used comprises all benzenepolycarboxylic acids per se, for example phthalic acid, isophthalic acid, terephthalic acid, trimellitic acid, trimesic acid, hemimellitic acid and pyromellitic acid and derivatives thereof, in particular mono-, di-, tri- and tetraesters, in particular alkyl esters, and anhydrides being mentioned. The alkyl esters of said acids are preferred, the alkyl group preferably being a radical R which was defined above.

The preferably used alkyl benzene polycarboxylates are prepared in general by reacting benzenepolycarboxylic acids with the alcohols corresponding to the alkyl groups of the esters. Suitable reaction conditions for the reaction of the benzenepolycarboxylic acids with the corresponding alcohols are known to the person skilled in the art.

In addition to the cyclohexanepolycarboxylic acid derivatives described and cyclohexanepolycarboxylic acid derivative mixtures obtainable by the process according to the invention, isoalkane mixtures which have a very high proportion of alkanes of the same molecular weight are also suitable. These include cyclohexanepolycarboxylic acid derivative mixtures which have greater than or equal to 95% by weight, preferably at least 96% by weight, in particular at least 97% by weight, of cyclohexanepolycarboxylic acid derivatives of the same molecular weight.

The present invention therefore furthermore relates to the use of a mixture containing at least one polyol and at least one cyclohexanepolycarboxylic acid derivative as a dust-reducing component in construction chemistry products, the cyclohexanepolycarboxylic acid derivatives being preparable by the following process a) esterification of a benzenepolycarboxylic acid of the formula II

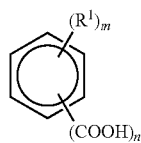

(II)

in which
R$^1$ denotes C$_1$-C$_{10}$-alkyl or C$_3$-C$_8$-cycloalkyl,
m denotes 0, 1, 2 or 3 and
n denotes 2, 3 or 4,
with one or more alcohols of the formula

R—OH in which
R denotes C$_1$-C$_{30}$-alkyl, preferably C$_1$-C$_{20}$-alkyl, particularly preferably C$_1$-C$_{18}$-alkyl, very particularly preferably C$_1$-C$_{13}$-alkyl,
a benzenepolycarboxylate of the formula III being obtained

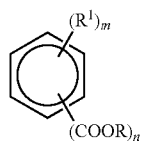

(III)

b) hydrogenation of the benzenepolycarboxylate of the formula III to give a corresponding cyclohexanepolycarboxylate.

Preferred embodiments of R1, m, n and R are mentioned above with regard to the cyclohexanepolycarboxylates according to formula I.

A preferred embodiment of the hydrogenation of the benzenepolycarboxylate of the formula III (step b)) is mentioned above.

Preferably used benzenepolycarboxylic acids are phthalic acid, isophthalic acid, terephthalic acid, trimellitic acid, trimesic acid, hemimellitic acid and pyromellitic acid. Phthalic acid is very particularly preferably used. The abovementioned acids are commercially available.

Preferably used alcohols are the alcohols corresponding to the radicals R of the cyclohexanepolycarboxylic acid derivatives of the formula I. Thus, linear or branched alcohols having C$_1$-C$_{13}$-alkyl radicals are preferably used. The alcohols used for esterification with the benzenepolycarboxylic acids can be in each case those individual isomers of the alcohols which correspond to the abovementioned radicals R or may be mixtures of different alcohols having isomeric alkyl radicals with the same number of carbon atoms and/or may be mixtures of different alcohols having a different number of carbon atoms.

The alcohols or alcohol mixtures which are suitable for reaction with the benzenepolycarboxylic acids can be prepared by all processes known to the person skilled in the art. Suitable processes for the preparation of alcohols or process steps which are used in the preparation of alcohols are, for example:

hydroformylation with subsequent hydrogenation of the aldehydes formed, for example as disclosed in WO 92/13818, DE-A 2 009 505, DE-A 199 24 339, EP-A 1 113 034, WO 00/63151, WO 99/25668, JP-A 1 160 928, JP-A 03 083 935, JP-A 2000/053803, EP-A 0 278 407, EP-A 1 178 029, FR-A 1 304 144, JP-A 30 44 340, JP-A 30 44 341, JP-A 30 44 342, JP-A 0 40 36 251, GB-A 721,540, DE-A 195 304 14, JP-A 2001/049029, U.S. Pat. No. 2,781,396, U.S. Pat. No. 3,094,564, FR-A 1 324 873, JP-A 0 816 9854, U.S. Pat. No. 3,153,673, U.S. Pat. No. 3,127,451, U.S. Pat. No. 1,828,344, WO 2003/66642, WO 2003/18912, EP-A 0 424 767, WO 2002/68369, EP-A 0 366 089, JP-A 2001/002829, DE-A 100 35 617, DE-A 199 55 593, WO 2002/00580, EP-A 0 643 031, U.S. Pat. No. 2,876,264, JP-A 2000/319444 and DE-A 100 32 580;

hydrogenation of aldol products, for example as disclosed in DE-A 102 51 311, JP-A 05 194 761, U.S. Pat. No. 3,272,873, DE-A 3 151 086, JP-A 2001/322959, WO 98/03462 and EP-A 0 603 630;

hydrogenation of alkenes, for example as disclosed in U.S. Pat. No. 5,136,108, EP-A 0 325 144, EP-A 0 325 143, DE-A 100 50 627, U.S. Pat. No. 4,982,022, GB-A 2,187, 741, DE-A 36 28 008, U.S. Pat. No. 3,277,191, JP-A 2000/191 566, DE-A 854 377, DE-A 38 01 275, DE-A 39 25 217, JP-A 06 321 828, JP-A 02 088 536, JP-A 06 287 156, JP-A 06 287 155, JP-A 54 141 712, JP-A 08 283 186, JP-A 09 263 558 and U.S. Pat. No. 4,684,751.

Hydrogenation of carboxylic acids and carboxylic esters, in particular fatty acids and fatty acid esters, for example as disclosed in U.S. Pat. No. 5,463,143, U.S. Pat. No. 5,475,159, WO 94/10112, CA 2,314,690, WO 94/06738, JP-A 06 065 125 and U.S. Pat. No. 3,361,832.

Hydrogenation of unsaturated alcohols or of carbonyl compounds, for example as disclosed in EP-A 0 394 842, DE-A 1 269 605, WO 88/05767, FR-A 1,595,013, EP-A 0 326 674, BE-A 756 877, BE-A 757 561, DE-A 1 277 232, FR-A 1,499,041 and DE-A 1 276 620;

hydrogenation of epoxides, for example as disclosed in FR-A 1,508,939, GB-A 879 803 and DE-A 1 078 106;

process comprising a telomerization step, for example as disclosed in EP-A 0 330 999, DE-A 1 138 751, U.S. Pat. No. 5,908,807, NE-6,603,884 and U.S. Pat. No. 3,091, 628, process comprising an isomerization step, for example as disclosed in DE-A 42 28 887;

hydrolysis of sulphates, for example as disclosed in GB-A 1,165,309;

reaction of dienes with amines, for example as disclosed in DE-A 44 31 528;

enzymatic preparation of alcohols, for example as disclosed in WO 93/24644;

selective hydrogenation of dienes, for example as disclosed in U.S. Pat. No. 3,203,998, DE-A 21 41 186, GB-A 2,093,025, JP-A 02 129 24, JP-A 1 122 8468, DE-A 195 44 133, WO 94/00410, GB-A 2,260,136, DE-A 44 10 746 and JP-A 08 176 036;

preparation of alcohols from nitriles, for example as disclosed in EP-A 0 271 092;

preparation of alcohols by reaction of alkynes, for example as disclosed in RU 205 9597-C1; and hydrogenolysis of substituted tetrahydropyrans, for example as disclosed in GB 1,320,188.

The person skilled in the art is familiar with further processes for the preparation of alcohols, which can also be used for the preparation of alcohols or alcohol mixtures which are suitable for esterification with benzenepolycarboxylic acids. Preferably used alcohols are—as mentioned above—alcohols which have $C_1$-$C_{13}$-alkyl radicals. In particular, the relatively long-chain $C_5$-$C_{13}$-alcohols or alcohol mixtures which contain these alcohols are particularly preferably prepared by catalytic hydroformylation (also referred to as oxo reaction) of olefins and subsequent hydrogenation of the aldehydes formed. Suitable hydroformylation processes are known to the person skilled in the art and are disclosed in the abovementioned documents. The alcohols and alcohol mixtures disclosed in said documents can be reacted with the abovementioned benzenepolycarboxylic acids to give the desired alkyl benzenepolycarboxylates or mixtures thereof.

$C_5$-Alcohols or mixtures which contain $C_5$-alcohols, particularly preferably n-pentanol, can be prepared, for example, by hydroformylation of butadiene in the presence of an aqueous solution of a rhodium compound and of a phosphine as a catalyst. Such a process is disclosed, for example, in EP-A 0 643 031.

Suitable $C_7$-alcohol mixtures which can be used for esterification with the benzenepolycarboxylic acids are disclosed, for example, in JP-A 2000/319 444. The preparation of the $C_7$-alcohol mixture is effected by hydroformylation with subsequent hydrogenation of the aldehydes formed.

Mixtures containing $C_8$-alcohols and their preparation processes are disclosed, for example, in GB-A 721 540, wherein a process for the preparation of isooctyl alcohols starting from heptenes by means of hydroformylation and subsequent hydrogenation is described. Further documents which disclose the preparation of $C_7$-alcohols or mixtures containing these alcohols are DE-A 195 30 414, JP-A 2001/49029, U.S. Pat. No. 2,781,396, U.S. Pat. No. 3,094,564, FR-A 1,324,873, JP-A 08 169 854, U.S. Pat. No. 3,153,673, U.S. Pat. No. 3,127,451 and U.S. Pat. No. 1,828,344.

$C_9$-Alcohols or mixtures containing $C_9$-alcohols are preferably prepared by dimerization of butenes, hydroformylation of the octenes obtained and subsequent hydrogenation of the $C_9$-aldehyde obtained.

Suitable processes and mixtures containing $C_9$-alcohols are disclosed, for example, in WO 92/13818, DE-A 20 09 505, DE-A 199 24 339, EP-A 1 113 034, WO 2000/63151, WO 99/25668, JP-A 1 160 928, JP-A 03 083 935, JP-A 2000/053803, EP-A 0 278 407 and EP-A 1 178 029.

$C_{10}$-Alcohols and mixtures containing these alcohols are disclosed, for example, in WO 2003/66642, WO 2003/18912, EP-A 0 424 767, WO 2002/68369, EP-A 0 366 089 and JP-A 2001/002829.

$C_{12}$-Alcohols or mixtures containing $C_{12}$-alcohols, in particular trimethylnonanol, and a process for the preparation thereof are disclosed, for example, in WO 98/03462.

$C_{13}$-Alcohols and mixtures containing these alcohols are disclosed, for example, in DE-A 100 32 580, DE-A 199 55 593 and WO 2002/00580.

Dialkyl esters of the abovementioned cyclohexanedicarboxylic acids, in particular 1,2-, 1,3- or 1,4-dialkyl esters and very particularly preferably 1,2-dialkyl esters, are particularly preferably used in the auxiliaries or as auxiliaries according to the present application. It is possible to use dialkyl esters in which both ester groups of the dialkyl esters carry the same alkyl radicals and dialkyl esters in which the two ester groups of the dialkyl esters carry different alkyl groups. Examples of mixed and non-mixed dialkyl esters of the cyclohexanedicarboxylic acids have already been mentioned above. Furthermore, it is possible for the alkyl groups of the alkyl cyclohexanedicarboxylates to have the same number of carbon atoms but to be straight-chain or have different branches and thus to form isomer mixtures. Such isomer mixtures can also be used if the number of carbon atoms of the alkyl groups of the dialkyl esters is different. The proportion of different isomers of the alkyl groups is obtained in general from the composition of the alcohols which are used for esterifying the benzenedicarboxylic acids which are hydrogenated after esterification to give the cyclohexanedicarboxylates. Suitable alcohol mixtures have already been mentioned above. In the context of the present application, straight-chain or branched alkyl radicals having a certain number of carbon atoms are therefore to be understood as meaning not only the respective individual isomers but also isomer mixtures whose composition—as mentioned above—arises from the composition of the alcohols used for esterifying the benzenedicarboxylic acids. In the context of the present application, straight-chain alkyl radicals are to be understood as meaning exclusively straight-chain alkyl radicals but also mixtures of alkyl radicals which are predominantly straight-chain.

If the alkyl radicals R of the cyclohexanepolycarboxylates are $C_1$- to $C_4$-alkyl radicals, they are obtained by reacting the benzenepolycarboxylic acids of the formula II with methanol, ethanol, n-propanol, isopropanol, n-butanol, isobutanol, sec-butanol or tert-butanol. In each case mixtures of said propanols or butanols or individual isomers can be used for the preparation of benzenepolycarboxylates in which R is 3 or 4. Individual isomers of propanol or of butanol are preferably used. The preparation of the abovementioned $C_1$- to $C_4$-alcohols is known to the person skilled in the art.

If the alkyl radicals R of the cyclohexanepolycarboxylates are $C_5$- to $C_{13}$-alkyl radicals, it is preferable to use $C_5$- to $C_{13}$-alcohols which have degrees of branching (ISO index) of in general 0.10 to 4, preferably 0.5 to 3, particularly preferably 0.8 to 2 and in particular 1 to 1.5, i.e. in general the respective alcohols are mixtures of different isomers. $C_9$-alcohol mixtures having an ISO index of 1 to 1.5, in particular nonanol mixtures having an ISO index of 1.25 or 1.6, are very particularly preferably used.

The ISO index is a dimensionless quantity which was determined by means of gas chromatography.

Method: Capillary GC

Apparatus: Capillary gas chromatograph with autosampler, split/splitless injection system and flame ionization dector (FID)

Chemicals: MSTFA (N-Methyl-N-trimethylsilyltrifluoroacetamide)

Comparisons for determination of the retention times

Sample preparation: 3 drops of the sample are in 1 ml MSTFA and kept for 60 minutes at 80° C.

GC conditions: Capillary column: Ultra-1

Length: 50 m

Internal diameter: 0.25 mm

Film thickness: 0.1 micron

Carrier gas: Helium

Column admission pressure: 200 psi constant

Split: 80 ml/min

Septum flushing: 3 ml/min

Oven temperature: 120° C., 25 min isothermal

Injector temperature: 250° C.

Detector temperature: 250° C. (FID)
Injection volume: 0.5 microliter
Calculation The procedure for calculating the ISO index is shown in the table below:

| Component | Name | Branching | Proportion in % by area | Index |
|---|---|---|---|---|
| 1 | 2-Ethyl-2-methylhexan-1-ol | 2 | 1.00 | 0.0200 |
| 2 | 2-Ethyl-4-methylhexan-1-ol | 2 | 1.00 | 0.0200 |
| 3 | 2-Ethyl-4-methylhexan-1-ol | 2 | 1.00 | 0.0200 |
| 4 | 2-Propyl-3-methyl-pentan-1-ol | 2 | 1.00 | 0.0200 |
| 5 | 2-Propyl-hexan-1-ol | 1 | 1.00 | 0.0100 |
| 6 | 2,5-Dimethylheptan-1-ol | 2 | 1.00 | 0.0200 |
| 7 | 2,3-Dimethylheptan-1-ol | 2 | 1.00 | 0.0200 |
| 8 | 2,3,4-Trimethylhexan-1-ol | 3 | 1.00 | 0.0300 |
| 9 | 2-Ethylheptan-1-ol | 1 | 1.00 | 0.0100 |
| 10 | 3-Ethyl-4-methylhexan-1-ol | 2 | 82.00 | 1.6400 |
| 11 | 3-Ethylheptan-1-ol | 1 | 1.00 | 0.0100 |
| 12 | 2-Methyloctan-1-ol | 1 | 1.00 | 0.0100 |
| 13 | 4,5-Dimethylheptan-1-ol | 2 | 1.00 | 0.0200 |
| 14 | 4,5-Dimethylheptan-1-ol | 2 | 1.00 | 0.0200 |
| 15 | 4-Methyloctan-1-ol | 1 | 1.00 | 0.0100 |
| 15a | 7-Methyloctan-1-ol | 1 | 1.00 | 0.0000 |
| 16 | 6-Methyloctan-1-ol | 1 | 1.00 | 0.0100 |
| 17 | Nonan-1-ol | 0 | 1.00 | 0.0000 |
| | | Total: | 99.00 | 1.9000 |
| | Unknown component | 2 | 1.00 | 0.0200 |
| | | | Iso index: | 1.9200 |

The $C_5$- to $C_{13}$-alcohols are prepared according to the abovementioned process. For the preparation of cyclohexanepolycarboxylates in which R is 9, a nonanol mixture in which 0 to 20% by weight, preferably 0.5 to 18% by weight, particularly preferably 6 to 16% by weight, of the nonanol mixture have no branch, 5 to 90% by weight, preferably 10 to 80% by weight, particularly preferably 45 to 75% by weight, have one branch, 5 to 70% by weight, preferably 10 to 60% by weight, particularly preferably 15 to 35% by weight, have two branches, 0 to 10% by weight, preferably 0 to 8% by weight, particularly preferably 0 to 4% by weight, have three branches and 0 to 40% by weight, preferably 0.1 to 30% by weight, particularly preferably 0.5 to 6.5% by weight, are other components is particularly preferably used. Other components are to be understood generally as meaning nonanols having more than three branches, decanols or octanols, the sum of said components being 100% by weight.

A particularly preferred embodiment of a nonanol mixture which is used for the preparation of preferably used cyclohexanepolycarboxylic acid derivatives has the following composition:

1.73 to 3.73% by weight, preferably 1.93 to 3.53% by weight, particularly preferably 2.23 to 3.23% by weight of 3-ethyl-6-methylhexanol;

0.38 to 1.38% by weight, preferably 0.48 to 1.28% by weight, particularly preferably 0.58 to 1.18% by weight of 2,6-dimethylheptanol;

2.78 to 4.78% by weight, preferably 2.98 to 4.58% by weight, particularly preferably 3.28 to 4.28% by weight of 3,5-dimethylheptanol;

6.30 to 16.30% by weight, preferably 7.30 to 15.30% by weight, particularly preferably 8.30 to 14.30% by weight of 3,6-dimethylheptanol;

5.74 to 11.74% by weight, preferably 6.24 to 11.24% by weight, particularly preferably 6.74 to 10.74% by weight of 4,6-dimethylheptanol;

1.64 to 3.64% by weight, preferably 1.84 to 3.44% by weight, particularly preferably 2.14 to 3.14% by weight of 3,4,5-trimethylhexanol;

1.47 to 5.47% by weight, preferably 1.97 to 4.97% by weight, particularly preferably 2.47 to 4.47% by weight of 3,4,5-trimethylhexanol, 3-methyl-4-ethylhexanol and 3-ethyl-4-methylhexanol;

4.00 to 10.00% by weight, preferably 4.50 to 9.50% by weight, particularly preferably 5.00 to 9.00% by weight of 3,4-dimethylheptanol;

0.99 to 2.99% by weight, preferably 1.19 to 2.79% by weight, particularly preferably 1.49 to 2.49% by weight of 4-ethyl-5-methylhexanol and 3-ethylheptanol;

2.45 to 8.45% by weight, preferably 2.95 to 7.95% by weight, particularly preferably 3.45 to 7.45% by weight of 4,5-dimethylheptanol and 3-methyloctanol;

1.21 to 5.21% by weight, preferably 1.71 to 4.71% by weight, particularly preferably 2.21 to 4.21% by weight of 4,5-dimethylheptanol;

1.55 to 5.55% by weight, preferably 2.05 to 5.05% by weight, particularly preferably 2.55 to 4.55% by weight of 5,6-dimethylheptanol;

1.63 to 3.63% by weight, preferably 1.83 to 3.43% by weight, particularly preferably 2.13 to 3.13% by weight of 4-methyloctanol;

0.98 to 2.98% by weight, preferably 1.18 to 2.78% by weight, particularly preferably 1.48 to 2.48% by weight of 5-methyloctaonol;

0.70 to 2.70% by weight, preferably 0.90 to 2.50% by weight, particularly preferably 1.20 to 2.20% by weight of 3,6,6-trimethylhexanol;

1.96 to 3.96% by weight, preferably 2.16 to 3.76% by weight, particularly preferably 2.46 to 3.46% by weight of 7-methyloctanol;

1.24 to 3.24% by weight, preferably 1.44 to 3.04% by weight, particularly preferably 1.74 to 2.74% by weight of 6-methyloctanol;

0.1 to 3% by weight, preferably 0.2 to 2% by weight, particularly preferably 0.3 to 1% by weight of n-nonanol;

25 to 35% by weight, preferably 28 to 33% by weight, particularly preferably 29 to 32% by weight of other alcohols having 9 and 10 carbon atoms; the overall sum of said components being 100% by weight.

A further particularly preferred embodiment of the nonanol mixture which is used for the preparation of preferably used cyclohexanepolycarboxylic acid derivatives has the following composition:

6.0 to 16.0% by weight, preferably 7.0 to 15.0% by weight, particularly preferably 8.0 to 14.0% by weight of n-nonanol;

12.8 to 28.8% by weight, preferably 14.8 to 26.8% by weight, particularly preferably 15.8 to 25.8% by weight of 6-methyloctanol;

12.5 to 28.8% by weight, preferably 14.5 to 26.5% by weight, particularly preferably 15.5 to 25.5% by weight of 4-methyloctanol;

3.3 to 7.3% by weight, preferably 3.8 to 6.8% by weight, particularly preferably 4.3 to 6.3% by weight of 2-methyloctanol;

5.7 to 11.7% by weight, preferably 6.3 to 11.3% by weight, particularly preferably 6.7 to 10.7% by weight of 3-ethylheptanol;

1.9 to 3.9% by weight, preferably 2.1 to 3.7% by weight, particularly preferably 2.4 to 3.4% by weight of 2-ethylheptanol;

1.7 to 3.7% by weight, preferably 1.9 to 3.5% by weight, particularly preferably 2.2 to 3.2% by weight of 2-propylhexanol;

3.2 to 9.2% by weight, preferably 3.7 to 8.7% by weight, particularly preferably 4.2 to 8.2% by weight of 3.5-dimethylheptanol;

6.0 to 16.0% by weight, preferably 7.0 to 15.0% by weight, particularly preferably 8.0 to 14.0% by weight of 2.5-dimethylheptanol;

1.8 to 3.8% by weight, preferably 2.0 to 3.6% by weight, particularly preferably 2.3 to 3.3% by weight of 2.3-dimethylheptanol;

0.6 to 2.6% by weight, preferably 0.8 to 2.4% by weight, particularly preferably 1.1 to 2.1% by weight of 3-ethyl-4-methylhexanol;

2.0 to 4.0% by weight, preferably 2.2 to 3.8% by weight, particularly preferably 2.5 to 3.5% by weight of 2-ethyl-4-methylhexanol;

0.5 to 6.5% by weight, preferably 1.5 to 6% by weight, particularly preferably 1.5 to 5.5% by weight, of other alcohols having 9 carbon atoms;

the overall sum of said components being 100% by weight.

The present invention furthermore relates to mixtures containing at least one polyol and at least one cyclohexanepolycarboxylic acid derivative, the cyclohexanepolycarboxylate being preparable by a process comprising the steps a) esterification of a benzenepolycarboxylic acid of the formula II

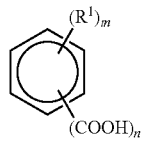

(II)

in which
R$^1$ denotes C$_1$-C$_{10}$-alkyl or C$_3$-C$_8$-cycloalkyl,
m denotes 0, 1, 2 or 3 and
n denotes 2, 3 or 4,
with one or more alcohols of the formula

R'—OH in which
R' denotes C$_5$-C$_{13}$-alkyl,
the alkyl radicals R' having degrees of branching of 0.1 to 4, preferably 0.5 to 3, particularly preferably 0.8 to 2, very particularly preferably 1 to 1.5 (ISO index),
a benzenepolycarboxylate of the formula III' being obtained

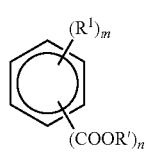

(III')

b) hydrogenation of the benzenepolycarboxylate of the formula III' to give a corresponding cyclohexanepolycarboxylate.

Preferred alcohols R'—OH, in particular nonanol mixtures, are the abovementioned alcohols and alcohol mixtures. Preferred embodiments of R$^1$, m and n are mentioned above with regard to the cyclohexanepolycarboxylates according to formula I.

The mixture according to the invention, containing at least one polyol and at least one cyclohexanepolycarboxylic acid derivative, prepared by the process described above, is particularly suitable as a dust-reducing mixture in construction chemistry products. The invention therefore furthermore relates to pulverulent construction chemistry products containing a mixture of at least one polyol and at least one cyclohexanepolycarboxylic acid derivative, which arise from the uses described above.

The pulverulent construction chemistry products may contain further customary ingredients or constituents, such as, for example hardening accelerators, sulphate carriers, antifoams, etc. These products are distinguished in an advantageous manner by a proportion of latently hydraulically setting and/or hydraulically setting components in the range from 10 to 90% by weight, preferably 20 to 60% by weight, based in each case on the total composition.

The invention furthermore comprises a corresponding pulverulent, construction chemistry product which is a lime- and/or gypsum- and/or cement-containing mortar. According to an additional variant, this product is a mortar such as, for example, tile adhesive, joint mortar, repair mortar, or reinforcing mortar, but also filling compounds, slurry coatings, bonding slurries, screeds or renders.

The pulverulent, construction chemistry product which is also claimed and is based on a mixture containing at least one polyol and at least one cyclohexanepolycarboxylic acid derivative may be in particular a mortar which contains at least one latently hydraulic component which is activated under alkaline conditions and is, for example, a geopolymer. Geopolymers are relatively novel mineral building materials which have fire resistance and acid resistance as typical properties and moreover possess advantageous ecological properties. Chemically, geopolymers are based on aluminosilicates and are substantially polysilico-oxo-aluminates.

The preferred mixtures according to the invention, comprising at least one polyol and at least one cyclohexanepolycarboxylic acid derivative, are substantially free of natural odors and have a wide liquid range (at least from 0 to +150° C.).

The amount of the mixture used as the dedusting additive is 0.01 to 10% by weight, preferably 0.1 to 3% by weight and particularly preferably 0.2 to 2.0% by weight, based on the construction chemistry product to be dedusted.

The mixing ratios of the dedusting components used according to the invention can be freely chosen within wide ranges, it being possible for the mixtures to consist of 5 to 99.95% by weight of polyol and 95 to 0.05% by weight of cyclohexanepolycarboxylic acid derivatives. In particular, mixtures comprising 85 to 99.9% by weight of polyol and 15 to 0.1% by weight of cyclohexanepolycarboxylic acid derivatives, preferably 90 to 99% by weight of polyol and 10 to 1.0% by weight of cyclohexanepolycarboxylic acid derivatives, have proved particularly advantageous.

The invention furthermore relates to a process for the preparation of pulverulent construction chemistry products having reduced dust formation behaviour, containing at least one polyol and at least one cyclohexanepolycarboxylic acid derivative of the formula (I). The mixtures containing at least one polyol and at least one cyclohexanepolycarboxylic acid derivative of the formula (I) are brought into contact or treated with the construction chemistry product. In general, this is effected by spraying the dedusting additives (by means of a nozzle) onto the construction chemistry products with a mixture as defined above. The treatment or the bringing into contact of the dedusting additives used according to the invention with the construction chemistry products to be dedusted can, however, also be effected in any other suitable way which is familiar to the person skilled in the art, for example mixing the construction chemistry products to be dedusted with the mixture of the preferably liquid dedusting additives. According to the invention, however, spray application of the dedusting additives is preferred because this is the simplest and most economical variant of the treatment of the products to be dedusted.

However, it is of course also possible to melt the components of the dedusting agent which are solid at room temperature and to bring them into contact in this form with the construction chemistry product. It is to be regarded as being preferable to bring the components according to the invention, containing at least one polyol and containing at least one cyclohexanepolycarboxylic acid derivative of the formula (I), as a mixture into contact with the construction chemistry product. However, it is also possible to incorporate the two components separately and optionally in successive operations into the construction chemistry product.

Individual components to which dedusting agent is added can even serve as carrier for dedusting further formulation components (e.g. cement). On addition of 2.0% of dedusting agent (90 parts of polyethylene glycol (Pluriol E400 from BASF SE) and 10 parts of diisononyl cyclohexane-1,2-dicarboxylate (Hexamoll DINCH from BASF SE)) to 5 g of polymer powder (Acronal® S695P from BASF SE), for example, 35 g of Portland cement (CEM I 42.5) can be dedusted. It is sufficient here if the "impregnated" polymer powder is simply mixed with the cement.

The industrial user therefore has the possibility of using pre-dedusted components by simple admixing in his plant and thus dedusting the total dry mixture. Complicated changes to the process are dispensed with thereby.

Owing to the low viscosity and good distribution of the product, it is also possible simply to meter in the dedusting agent in the process.

As described above, when they are used as dedusting additives for dry, pulverulent construction chemistry products, the mixtures used according to the invention lead to a substantial minimization of the dust release in the case of these products.

This effect can be further increased if the additives according to the invention are used in combination with further suitable additives known from the prior art, for example fibres, such as polyethylene or polypropylene fibres, which have a dedusting effect.

The invention is illustrated in more detail on the basis of the following, nonlimiting examples.

EXAMPLES

The dry mortar mix (tile adhesive 1) mentioned below was obtained by weighing the respective individual components into a mixing container and then mixing them homogeneously with the aid of a drill with attached disk stirrer.

Dry Mortar Mixes

| Tile adhesive 1 | |
| --- | --- |
| Portland cement CEM I | 60.5% by weight |
| Quartz sand 0.1-0.5 mm | 23.6% by weight |
| Ground limestone <0.1 mm | 10.5% by weight |
| Cellulose ether | 1.9% by weight |
| Dispersion powder | 3.0% by weight |
| Hardening accelerator | 0.5% by weight |

Method of Measurement

The measurements were carried out on the basis of DIN 55999-2 "Determination of a measure for the dust emission of pigments and fillers—Part 2: Dropdown method". The "SP3 dust measuring instrument" from LORENZ MESSGERÄTEBAU GmbH & Co. KG was used for the measurement.

A) Sample Preparation

The dry mortar mix was initially introduced into a mixing vessel. The dedusting additive mixture according to the invention, consisting of the polyethylene glycol (Pluriol E400 from BASF SE) and diisononyl cyclohexane-1,2-dicarboxylate (Hexamoll DINCH from BASF SE), was applied in the stated ratio to the dry mortar mix by means of a pressure spray ("flower spray") and mixed with the mortar.

Results

Dust Indices

1) Polyethylene glycol (Pluriol E400 from BASF SE) (comparison)

| | 0 days | 7 days | 14 days | 28 days | 56 days | 84 days | 112 days | 140 days | 168 days |
| --- | --- | --- | --- | --- | --- | --- | --- | --- | --- |
| 2% Pluriol E400 | 14 | 32 | 31 | 42 | 48 | 41 | 57 | 52 | 48 |

2) Diisononyl cyclohexane-1,2-dicarboxylate (Hexamoll DINCH from BASF SE) (comparison)

| | 0 days | 7 days | 14 days | 24 days | 28 days | 56 days | 84 days | 112 days | 140 days | 168 days |
| --- | --- | --- | --- | --- | --- | --- | --- | --- | --- | --- |
| 2% Hexamoll DINCH | 19 | 25 | 27 | 13 | 19 | 31 | 34 | X | 16 | 21 |

3) Mixture of Pluriol E400 and Hexamoll DINCH (according to the invention) Total dose=2.0%

|  | 0 days | 7 days | 14 days | 28 days | 56 days | 84 days | 112 days | 140 days | 168 days |
|---|---|---|---|---|---|---|---|---|---|
| 2% (10 parts of Hexamoll DINCH and 90 parts of Pluriol E400) | 14 | 26 | 26 | 28 | 38 | 33 | 46 | 32 | 37 |
| 2% (5 parts of Hexamoll DINCH and 95 parts of Pluriol E400) | 8 | 24 | 24 | 36 | 31 | 39 | 35 | 31 | 30 |
| 2% (3 parts of Hexamoll DINCH and 97 parts of Pluriol E400) | 8 | 16 | 24 | 26 | 30 |  |  |  |  |
| 2% (2 parts of Hexamoll DINCH and 98 parts of Pluriol E400) | 10 | 28 | 28 | 38 | 27 | 39 | 41 | 33 | 40 |

B) Sample Preparation

The dry mortar mix was initially introduced into a mixing vessel. The dedusting additive according to the invention, consisting of the polyethylene glycol (Pluriol E400 from BASF SE) and diisononyl cyclohexane-1,2-dicarboxylate (Hexamoll DINCH from BASF SE), was applied in the stated ratio, separately, in succession and in the stated sequence, to the dry mortar mix by means of a pressure spray ("flower spray") and mixed with the mortar.

Results
Dust Indices

4) Pluriol E400 and Hexamoll DINCH (according to the invention), metered separately, Total dose=2.0%

| 2% (10 parts of Hexamoll DINCH and 90 parts of Pluriol E400) | 9 | 9 | 12 | 13 | 16 |
| 2% (90 parts of Pluriol E400 and 10 parts of Hexamoll DINCH) | 6 | 7 | 10 | 16 | 17 |

The invention claimed is:

1. A pulverulent construction chemistry product containing a mixture of at least one polyol and at least one cyclohexanepolycarboxylic acid derivative of formula (I),

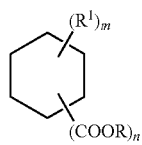

in which
R$^1$ represents C$_1$-C$_{10}$-alkyl or C$_3$-C$_8$-cycloalkyl,
M represents 0, 1, 2 or 3,
n represents 2, 3 or 4, and
R represents hydrogen or C$_1$-C$_{30}$-alkyl, C$_1$-C$_{30}$-alkoxy or C$_3$-C$_8$-cycloalkyl, with at least one radical R representing C$_1$-C$_{30}$-alkyl, C$_1$-C$_{30}$-alkoxy or C$_3$-C$_8$-cycloalkyl; and
wherein the product is a lime- and/or gypsum- and/or cement-containing mortar and/or a hydraulic binder activated under alkaline conditions.

2. The product according to claim 1 wherein the product is a mortar, tile adhesive, joint mortar, filling compound, slurry coating, repair mortar, screed, reinforcing mortar, render or bonding slurry.

3. A process for the preparation of a pulverulent construction chemistry product having reduced dust behaviour comprising bringing individual components thereof or mixtures of individual components thereof into contact with at least one polyol and at least one cyclohexanepolycarboxylic acid derivative of the formula (I)

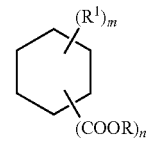

in which
R$^1$ represents C$_1$-C$_{10}$-alkyl or C$_3$-C$_8$-cycloalkyl,
m represents 0, 1, 2 or 3,
n represents 2, 3 or 4 and
R represents hydrogen or C$_1$-C$_{30}$-alkyl, C$_1$-C$_{30}$-alkoxy or C$_3$-C$_8$-cycloalkyl, at least one radical R representing C$_1$-C$_{30}$-alkyl, C$_1$-C$_{30}$-alkoxy or C$_3$-C$_8$-cycloalkyl,
by spraying on and treating a surface of the components.

4. The process according to claim 3, comprising dedusting organic constituents of the construction chemistry product.

5. The process according to claim 3, comprising dedusting mineral constituents of the construction chemistry product.

6. The process according to claim 3, wherein R represents C$_1$-C$_{30}$-alkyl.

7. The process according to claim 3, wherein R represents at least one of methyl, ethyl, n-propyl, isopropyl, n-butyl, isobutyl, sec-butyl, tert-butyl, n-pentyl, n-hexyl, n-octyl, 2-ethylhexyl, n-nonyl, isononyl, n-decyl, isodecyl, n-undecyl, isoundecyl, n-dodecyl, isododecyl, n-tridecyl, isotridecyl, stearyl or n-eicosyl.

8. The process according to claim 3, wherein at least one of the cyclohexanepolycarboxylic acid derivatives is selected from the group consisting of monoalkyl esters and/or dialkyl esters of phthalic acid, of isophthalic acid and/or of terephthalic acid, which esters are hydrogenated on the nucleus;

monoalkyl esters, dialkyl esters and/or trialkyl esters of trimellitic acid, of trimesic acid and/or of hemimellitic acid, which esters are hydrogenated on the nucleus; and monoalkyl esters, dialkyl esters, trialkyl esters and/or tetraalkyl esters of pyromellitic acid.

9. The process according to claim 3, wherein the cyclohexane polycarboxylic acid derivatives are esters prepared by a process comprising:
a) esterification of a benzenepolycarboxylic acid of formula II

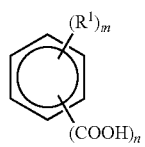

(II)

in which
$R^1$ denotes $C_1$-$C_{10}$-alkyl or $C_3$-$C_8$-cycloalkyl,
M denotes 0, 1, 2 or 3, and
n denotes 2, 3 or 4,
with one or more alcohols of the formula

R'—OH in which
R' denotes $C_5$-$C_{13}$-alkyl,
the alkyl radicals R' having degrees of branching of 0.1 to 4 (ISO index),
a benzenepolycarboxylate of formula III' being obtained

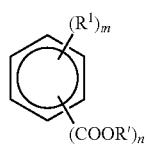

(III')

b) hydrogenation of the benzenepolycarboxylate of the formula III' to give a corresponding cyclohexanepolycarboxylate.

10. The process according to claim 9, wherein the alcohol R'—OH comprises a nonanol mixture.

11. The process according to claim 6, wherein the polyol is at least one of polyethylene glycol, polypropylene glycol, polytetramethylene glycol or polystyrene oxide.

12. The process according to claim 3, wherein a mixture of the polyol and the cyclohexanepolycarboxylic acid derivatives is used in amounts of 0.01 to 10.0% by weight, based in each case on the construction chemistry product to be dedusted.

13. The process according to claim 12, wherein the mixture comprises 5 to 99.95% by weight of the polyol and 95 to 0.05% by weight of the cyclohexanepolycarboxylic acid derivatives.

14. The product according to claim 1, wherein R represents $C_1$-$C_{30}$-alkyl.

15. The product according to claim 1, wherein R represents at least one of methyl, ethyl, n-propyl, isopropyl, n-butyl, isobutyl, sec-butyl, tert-butyl, n-pentyl, n-hexyl, n-octyl, 2-ethylhexyl, n-nonyl, isononyl, n-decyl, isodecyl, n-undecyl, isoundecyl, n-dodecyl, isododecyl, n-tridecyl, isotridecyl, stearyl or n-eicosyl.

16. The product according to claim 1, wherein at least one of the cyclohexanepolycarboxylic acid derivatives is selected from the group consisting of monoalkyl esters and/or dialkyl esters of phthalic acid, of isophthalic acid and/or of terephthalic acid, which esters are hydrogenated on the nucleus; monoalkyl esters, dialkyl esters and/or trialkyl esters of trimellitic acid, of trimesic acid and/or of hemimellitic acid, which esters are hydrogenated on the nucleus; and monoalkyl esters, dialkyl esters, trialkyl esters and/or tetraalkyl esters of pyromellitic acid.

17. The product according to claim 1, wherein the cyclohexane polycarboxylic acid derivatives are esters prepared by a process comprising
a) esterification of a benzenepolycarboxylic acid of formula II

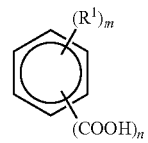

(II)

in which
$R^1$ denotes $C_1$-$C_{10}$-alkyl or $C_3$-$C_8$-cycloalkyl,
m denotes 0, 1, 2 or 3, and
n denotes 2, 3 or 4,
with one or more alcohols of the formula

R'—OH in which
R' denotes $C_5$-$C_{13}$-alkyl,
the alkyl radicals R' having degrees of branching of 0.1 to 4 (ISO index),
a benzenepolycarboxylate of formula III' being obtained

(III')

b) hydrogenation of the benzenepolycarboxylate of the formula III' to give a corresponding cyclohexanepolycarboxylate.

18. The product according to claim 1, wherein the alcohol R'OH comprises a nonanol mixture.

19. The product according to claim 1, wherein the polyol is at least one of polyethylene glycol, polypropylene glycol, polytetramethylene glycol or polystyrene oxide.

20. The product according to claim 1, wherein a mixture of the polyol and the cyclohexanepolycarboxylic acid derivatives is used in amounts of 0.01 to 10.0% by weight, based in each case on the construction chemistry product to be dedusted.

21. The product according to claim 20, wherein the mixture comprises 5 to 99.95% by weight of the polyol and 95 to 0.05% by weight of the cyclohexanepolycarboxylic acid derivatives.

* * * * *